United States Patent
Hailey et al.

(10) Patent No.: US 7,260,584 B2
(45) Date of Patent: Aug. 21, 2007

(54) DOCUMENT CREATION SYSTEM AND METHOD USING KNOWLEDGE BASE, PRECEDENCE, AND INTEGRATED RULES

(75) Inventors: Richard Warren Hailey, St. Cloud, MN (US); Richard Keith Wyman, St. Cloud, MN (US); Scott James Walter, Plymouth, MN (US); Thomas William Weitzel, Cold Spring, MN (US); Susan Bosl Hollingsworth, Sartell, MN (US); Abdias Evangelista-de Lira, Clinton Township, MI (US); Samuel Richard Hollingsworth, Sartell, MN (US); Paul John Gunn, Rochester Hills, MI (US)

(73) Assignee: Wolters Kluwer Financial Services, Inc., St. Cloud, MN (US)

( * ) Notice: Subject to any disclaimer, the term of this patent is extended or adjusted under 35 U.S.C. 154(b) by 469 days.

(21) Appl. No.: 10/814,548

(22) Filed: Mar. 31, 2004

(65) Prior Publication Data

US 2005/0080814 A1 Apr. 14, 2005

Related U.S. Application Data

(60) Provisional application No. 60/510,742, filed on Oct. 13, 2003, provisional application No. 60/542,076, filed on Feb. 4, 2004.

(51) Int. Cl.
*G06F 17/00* (2006.01)
*G06F 7/00* (2006.01)

(52) U.S. Cl. .................. 707/102; 707/103 R

(58) Field of Classification Search ............... 707/3–5, 707/8, 10, 100, 101, 103 R, 203, 102, 104.1; 715/513, 530, 775
See application file for complete search history.

(56) References Cited

U.S. PATENT DOCUMENTS

| 5,043,891 A | 8/1991 | Goldstein et al. |
| 5,367,619 A | 11/1994 | Dipaolo et al. |
| 5,630,127 A | 5/1997 | Moore et al. |

(Continued)

OTHER PUBLICATIONS

Rembrandt Lending System Utilities Guide, Jun. 1998, Third Edition, pp. 1-123, Bankers Systems, Inc., St. Cloud, MN.

(Continued)

*Primary Examiner*—Jeffrey Gaffin
*Assistant Examiner*—Jacques Veillard
(74) *Attorney, Agent, or Firm*—Michael Best & Friedrich LLP

(57) ABSTRACT

A data structure generation system. The system includes a knowledge base configured to store data structure components as objects in an object-relational hierarchy. Each object is configured to have a precedence, to include one or more rules, and to include content. The knowledge base may be coupled to a data structure assembly facility configured to retrieve one or more cross-referenced data structure components from a database. The one or more data structure components are configured to have a precedence level, and may be processed in a processor to generate a tree having a root node. The tree may be processed beginning at the root node, and objects of low precedence may be overridden with objects of high precedence.

21 Claims, 24 Drawing Sheets

U.S. PATENT DOCUMENTS

| | | | |
|---|---|---|---|
| 5,692,206 | A | 11/1997 | Shirley et al. |
| 5,924,109 | A | 7/1999 | Ackerman et al. |
| 6,000,642 | A | 12/1999 | Morey |
| 6,006,242 | A * | 12/1999 | Poole et al. ............... 715/531 |
| 6,188,999 | B1 | 2/2001 | Moody |
| 6,202,073 | B1 * | 3/2001 | Takahashi ................ 715/517 |
| 6,256,627 | B1 * | 7/2001 | Beattie et al. .............. 707/6 |
| 6,473,892 | B1 | 10/2002 | Porter |
| 6,519,578 | B1 * | 2/2003 | Reddy ....................... 706/45 |
| 6,711,585 | B1 * | 3/2004 | Copperman et al. ..... 707/104.1 |
| 6,763,500 | B2 | 7/2004 | Black et al. |
| 6,950,984 | B2 * | 9/2005 | Hori et al. ................. 715/513 |
| 6,980,984 | B1 * | 12/2005 | Huffman et al. ............ 707/3 |
| 7,007,034 | B1 * | 2/2006 | Hartman et al. ........... 707/102 |
| 7,076,494 | B1 * | 7/2006 | Baer et al. ................. 707/102 |
| 2001/0018697 | A1 | 8/2001 | Kunitake et al. |
| 2001/0044813 | A1 | 11/2001 | Frank |
| 2001/0051960 | A1 | 12/2001 | Kubick et al. |
| 2001/0051962 | A1 | 12/2001 | Plotkin |
| 2002/0138519 | A1 | 9/2002 | Miller |
| 2002/0138524 | A1 | 9/2002 | Ingle et al. |
| 2002/0178190 | A1 | 11/2002 | Pope et al. |
| 2003/0078949 | A1 | 4/2003 | Scholz et al. |
| 2003/0163809 | A1 * | 8/2003 | Bantz et al. ............... 717/177 |
| 2003/0187756 | A1 | 10/2003 | Klivington et al. |
| 2004/0103124 | A1 | 5/2004 | Kupkova |
| 2004/0250059 | A1 | 12/2004 | Ramelson et al. |

OTHER PUBLICATIONS

Rembrandt Lending System Product Overview, Oct. 1999, pp. 1-59, Third Edition, Bankers Systems, Inc., St. Cloud, MN.

Rembrandt Lending System Loan Operations Guide Part 1, Aug. 2000, pp. 1-235, Fourth Edition, Bankers Systems, Inc., St. Cloud, MN.

Rembrandt Lending System Loan Operations Guide Part 2, Aug. 2000, pp. 1-98, Fifth Edition, Bankers Systems, Inc., St. Cloud, MN.

Rembrandt Lending System Organization and User Management Guide, Aug. 2000, pp. 1-119, Third Edition, Bankers Systems, Inc., St. Cloud, MN.

ARTA Lending Documentation System User's Guide Part 1, Nov. 2000, pp. 1-212, Second Edition, Bankers Systems, Inc., St. Cloud, MN.

ARTA Lending Documentation System User's Guide Part 2, Nov. 2000, pp. 1-70, First Edition, Bankers Systems, Inc., MN.

Rembrandt Lending System Leading Policy Guide, Aug. 2000, pp. 1-187, Third Edition, Bankers Systems, Inc., St. Cloud, MN.

Rembrandt Lending System Forms and Tasks Descriptions/Glossary, Apr. 2001, pp. 1-143, Ninth Edition, Bankers Systems, Inc., St. Cloud, MN.

Rembrandt Lending System Powerful Technology Fused With Reliable Compliance Knowledge, revised Jun. 5, 2003, pp. 1-6, Bankers Systems, Inc., St. Cloud, MN.

RAKIS Document Control and Production System Executive Summary 2003, pp. 1-16, VMP Mortgage Solutions, Mortgage Business Unit, Bankers Systems, Inc., Fraser, MI.

Jason Harrop, OASIS LegalXML eContracts Technical Committee, Discussion Paper—XForms for Contract Semantics, http://lists.oasis-open.org/archives/legalxml-econtracts/200403/pdf00000.pdf, Mar. 11, 2004, Version 1.0, pp. 1-20.

Elliotte Rusty Harold and W. Scott Means; XML In a Nutshell, A Desktop Quick Reference; O'Reilly; Jan. 2001; O'Reily & Associates, Inc., Sebastopol, California, U.S.A.

ARTA Deposit Documentation System Accessible Technology Meets Sensible Compliance Help, Feb. 1, 2001, pp. 1-6, Bankers Systems, Inc., St. Cloud, MN.

ARTA Lending Documentation System Experience Proven Technology With Reliable Compliance Help. May 1, 2001, pp. 1-6, Bankers Systems, Inc., St. Cloud, MN.

ARTA Deposit Documentation System User's Guide Part 1 Version 2.5, Sep. 1, 2002, pp. 1-63, Bankers Systems, Inc., St. Cloud, MN.

ARTA Deposit Documentation System User's Guide Part II Version 2.5, Sep. 1, 2002, pp. 1-74, Bankers Systems, Inc., St. Cloud, MN.

ARTA Lending Documentation System Credit Insurance Setup Worksheets Credit Life Insurance, Disability Insurance, and Involuntary Unemployment Insurance, Jan. 6, 2003, pp. 1-14, Bankers Systems, Inc., St. Cloud, MN.

I-32 Forms Solutions, I-32 Forms Design: Features, 2003, pp. 1-2, VMP Mortgage Solutions, a Bankers Systems, Inc. company.

I-32 Forms Solutions, I-32 Forms Solutions: I-32 Featuring Editor, 2003, pp. 1-4, VMP Mortgage Solutions, a Bankers Systems, Inc. company.

* cited by examiner

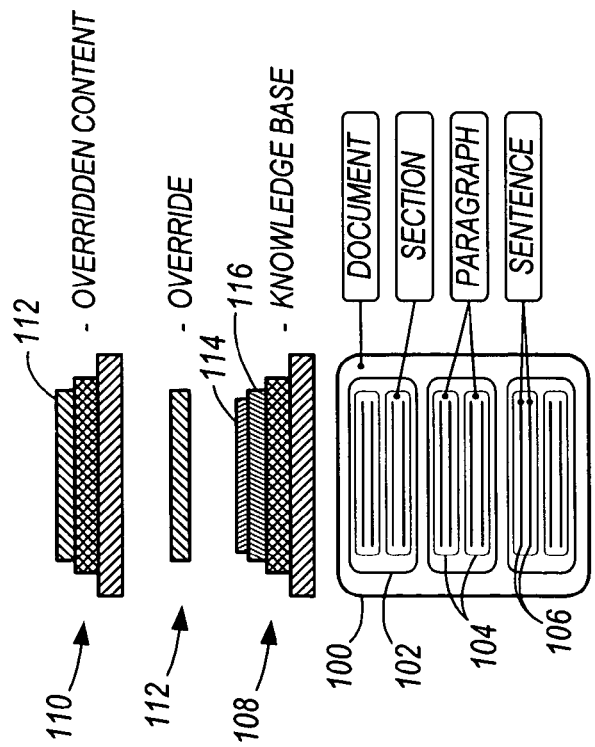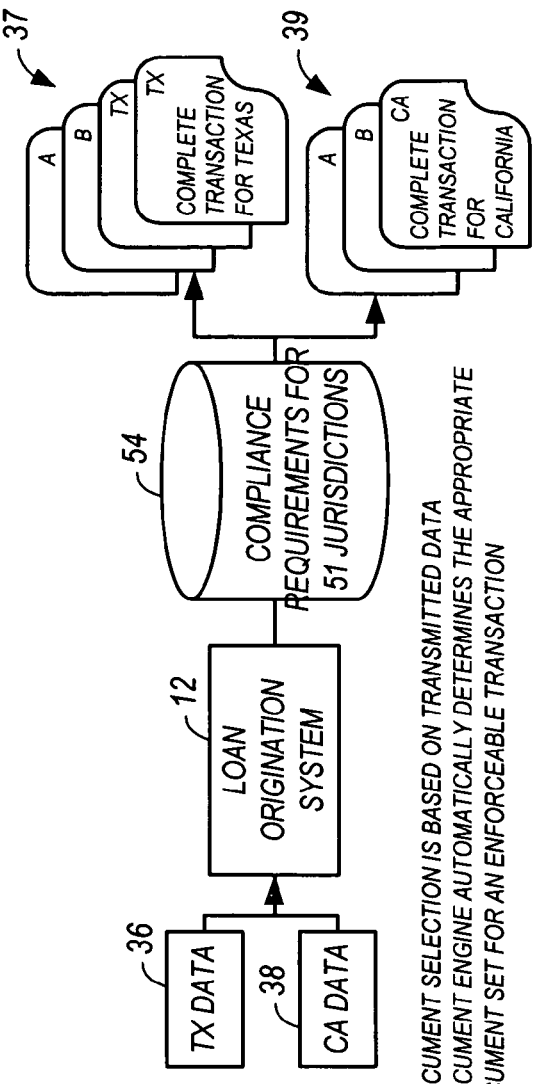

```
<DATATABLE>
<rdCurrency Name="LOANDETAILSDepositAmount" DataID="1016">
  <Data>
    <Datum><Value/></Datum>
  </Data>
</rdCurrency>
<rdText Name="LOANDETAILSLenderCaseNumber" DataID="709">
  <Data/>
</rdText>
<rdCurrency Name="LOANDETAILSLoanAmount" DataID="377">
  <Value/>
</rdCurrency>
<rdText Name="LT-BORROWER.Borr1stpage_namesfortrust_MR" DataID="602730">
  <Data/>
</rdText>
</DataTable>
```

FIG. 20

DOCUMENT CREATION SYSTEM AND METHOD USING KNOWLEDGE BASE, PRECEDENCE, AND INTEGRATED RULES

This application claims priority to U.S. Provisional Patent Application No. 60/542,076, filed on Feb. 4, 2004, and U.S. Provisional Patent Application No. 60/510,742, filed on Oct. 13, 2003.

BACKGROUND OF THE INVENTION

Embodiments of the invention relate to the creation of documents (such as contracts, forms, user manuals, instructional texts, and others). More particularly, embodiments of the invention relate to the creation of documents by assembling document components and applying precedence and rules to create a desired document.

Document production systems that insert customer-specific content into a pre-fabricated document are known. For example, in some known systems a boilerplate document is produced using word processing software. The boilerplate document is then reviewed and revised by a document developer, and stored in a storage device, such as a disk drive of a computer. The boilerplate document is then made available for use to an end-user, such as a bank or loan officer. The end-user retrieves the boilerplate document from the storage device and enters specific content into the document, such as names, addresses, prices, etc. Once the desired content is inserted into specified locations on the document, the completed form is printed.

Other document systems use a conventional relational database scheme to test specific input information against a table of rule sets which, in turn, are directly linked to various boilerplate clauses. For example, when working with insurance forms, a rule set is assigned to each insurance policy clause and each endorsement clause. The insurance and endorsement clauses and rule sets are stored in a memory coupled to the main processor. Each rule set includes at least one rule that must be satisfied in order to include the associated clause in the document. After entering customer-specific parameters into the computer, such as desired insurance coverages and the policy holder's state of residence, each and every rule in each and every rule set is evaluated to determine whether a particular clause is to be included in the document. In order to print a document, a printer database containing a redundant copy of each insurance and endorsement policy clause is utilized to supply the appropriate clauses.

Other known systems include those disclosed in U.S. Pat. No. 5,666,130 and U.S. Pat. No. 6,006,242. While these systems are different from one another in several ways, both systems use SGML (standard generalized markup language).

SUMMARY OF THE INVENTION

Although prior systems are functional, there remains a need for a document generation system that, among other things, can be integrated with existing front-end systems (such as loan generation systems) and existing back-end systems (such as existing printer servers and networks).

In one embodiment, the invention provides a document generation system that may be provided as a service, in the sense that the system fits between front-end systems (e.g., an existing command-line, loan processing system used by a bank) and a printing system (such as a printer server and printers that require information in a printer command language ("PCL") format). The system takes in information regarding the requirements (e.g., type of transaction, number of parties, amount of loan, price, governing law, etc.) of the document needed (e.g., a loan application, construction contract, etc.) and produces an appropriate form based on the input information.

The service provides a set of APIs to interface with the front-end software. Information from the front-end software is formatted according to a schema, such as an XML schema.

The service uses a knowledge base. In embodiments of the invention, the knowledge base is based on an object relational model rather than a relational database model, and every object or table in the object relational model may have at most one parent. In some embodiments, the knowledge base includes document components, such as, sections, paragraphs, and sentences. These components may be structured according to a markup language such as XML (extensible markup language) and include labels or tags that associate them with particular entities. For example, all Texas branches of a bank (which we will assign the fictitious name "SecondNationWide Bank") are associated with an identifier for that bank. The documents include embedded rules that are structured according to a rules markup language. For example, a rule might take a form similar to "If applicable law state=NY, add NY consumer protection clause." The information regarding the requirements of the needed document is sent to a document assembler. The requirements include an identifier of the party making the request for the document, for example, the Dallas, Texas branch of SecondNationWide Bank.

The document assembler also receives transaction information (e.g., the amount of a loan) from a transaction data set. The document assembler pulls document components from the knowledge base that meet the requirements delivered to the document assembler. The document assembler executes rules as it encounters them. In the event that the document assembler encounters two or more components in the knowledge base that meet the requirements of the needed document, the assembler chooses the document component according to the identity of the entity requesting the document, or, if no matching component is found, according to the identity of one of the entity's parents or ancestors. If no match is found, a default component is provided. This concept is referred to as "precedence" or "owner precedence."

As is apparent from the above, it is an advantage of the present invention to provide methods and systems of creating documents. Other features and advantages of the present invention will become apparent by consideration of the detailed description and accompanying drawings.

BRIEF DESCRIPTION OF THE DRAWINGS

In the drawings:

FIG. 5 is an illustration of an exemplary document selection process.

FIG. 6 is an illustration of the consequences of applying precedence.

FIG. 20 illustrates exemplary XML code for a portion of the data table shown in FIG. 19.

DETAILED DESCRIPTION

Figure 1:
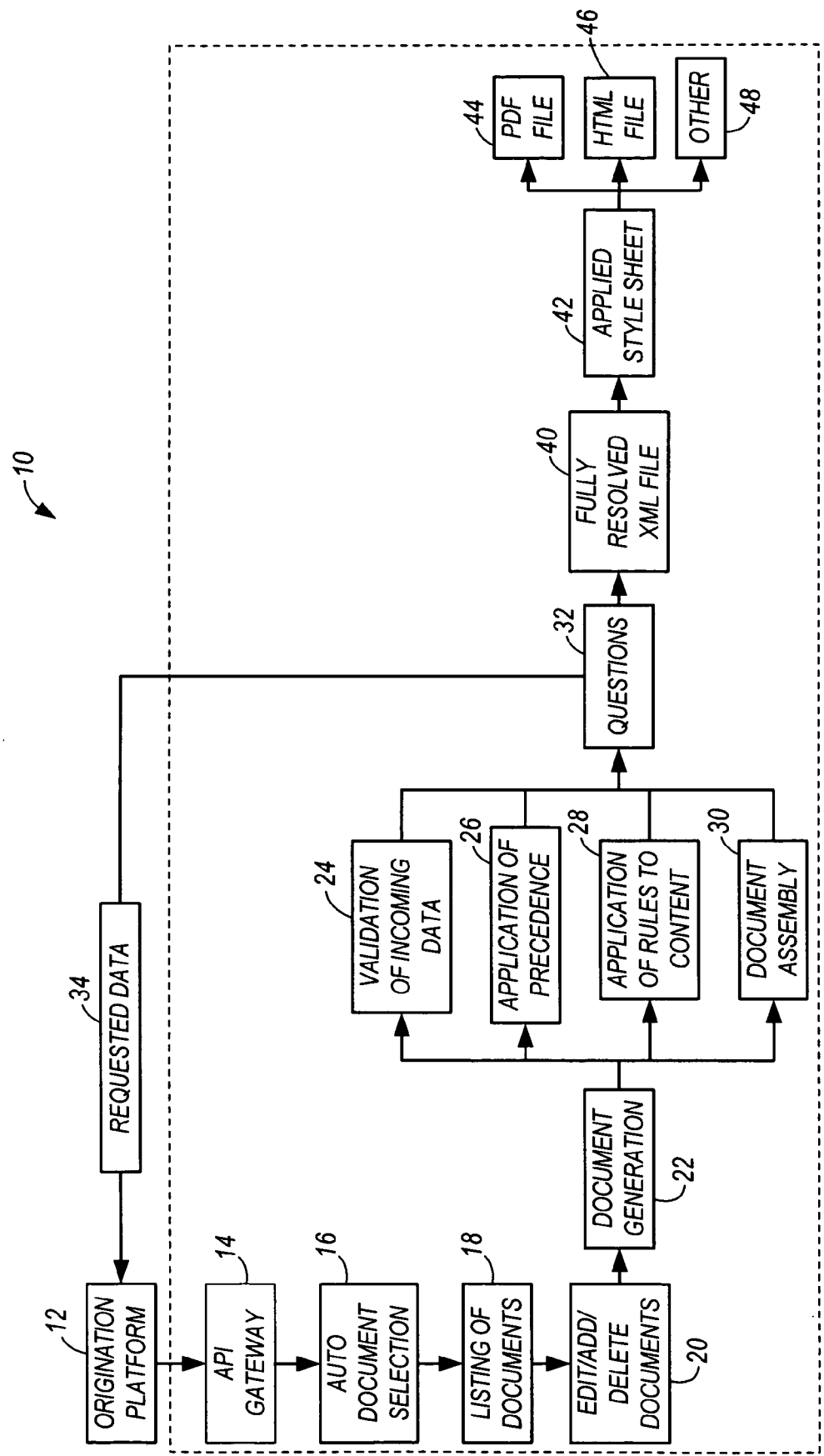
FIG. 1 is a schematic illustration of a system of one exemplary embodiment of the invention.

Before embodiments of the invention are explained in detail, it is to be understood that the invention is not limited in its application to the details of the construction and the arrangements of the components set forth in the following description or illustrated in the drawings. The invention is capable of still other embodiments and of being practiced or being carried out in various ways. Also, it is to be understood that the phraseology and terminology used herein is for the purpose of description and should not be regarded as limiting. Further, it is assumed that the reader has at least a rudimentary understanding of markup languages, such as SGML, and working knowledge of XML.

FIG. 1 illustrates an exemplary system 10 of one embodiment of the invention. The system 10 includes an origination platform 12, an application programming interface ("API") gateway 14, a document selection engine 16, an output of or listing of documents 18, an editing module or interface 20, and a document generation module 22, or more broadly, an assembly facility.

The origination platform 12 represents a front-end system such as a loan origination system, customer data collection system, or other system used to collect data to be included in one or more desired documents. In addition, the origination platform 12 provides information regarding the type of document needed or required for the situation at hand. In many circumstances, the origination platform 12 will be a legacy system, meaning that it is a system that has been used for a relatively long period of time for the purpose of collecting information relevant to a transaction or document need.

The origination platform 12 communicates with an interface, which in one embodiment of the invention takes the form of an API gateway. In one embodiment of the invention, the gateway 14 is designed to receive and transmit information that is structured according to one or more XML schemas. The gateway 14 delivers information to the document selection module or engine 16. The document selection module 16 interacts with a knowledge base (discussed below) to create a set of documents that, based on the input data from the origination platform, match or satisfy (at least to some level or degree) the requirements of the transaction. If desired, the document selection engine 16 may return the listing of documents 18 to the origination platform for display in a graphical user interface ("GUI") (not shown) presented to a user such that the user may choose to modify the list of documents in the editing module 20. For example, a transaction might typically require a form for a cosigner to execute. However, in circumstances where the primary borrower has sufficient creditworthiness, a cosigner may not be required. In that case, the user of the system 10 may delete the cosigner document from the listing of documents 18 using the editing module 20.

The listing of documents 18 (as edited, as the case may be) is delivered to the document generation module 22. As shown in FIG. 1, the document generation module 22 performs four basic functions. The document generation module 22 validates incoming data (as is represented by a validation module 24), applies precedence (as is represented by precedence module 26), applies rules to the content (as is represented by a rules application module 28), and performs document assembly (as is represented by an assembly module 30). Each of these operations will be discussed in greater detail below. Once the appropriate documents are assembled, the system 10 reviews them to ensure that they are complete. For example, if the amount of a loan has not been specified in the input data originally provided by the origination platform 12, a question module 32 queries the origination platform 12 to request needed information or data 34. A requirement for data 34 is added to a set of response messages that is returned to the client along with the assembled documents. The process continues even if all required information is not available or is invalid.

FIG. 5 illustrates the process of document selection in greater detail. For example, if a transaction will take place in the state of Texas, Texas data 36 is input into origination platform 12 (which is illustrated as a loan origination system). Processing of the data and information in the document generation module 22 results in the documents required to complete the Texas transaction, as shown by the set of documents 37. Likewise, if a transaction will take place in California, California data 38 is input into the origination platform 12 and processing results in the documents required to complete the California transaction, as shown by the set of documents 39.

The completed and assembled document or documents are each resolved to an XML file as shown in block 40 (FIG. 1). Style sheets or other formatting mechanisms are applied, as shown by block 42, and an output file (or document) is generated. The output file (or document) may be in one of a variety of file formats as is illustrated by three exemplary file format blocks (or documents) 44, 46, and 48 (.pdf, HTML, and other).

Figure 2:
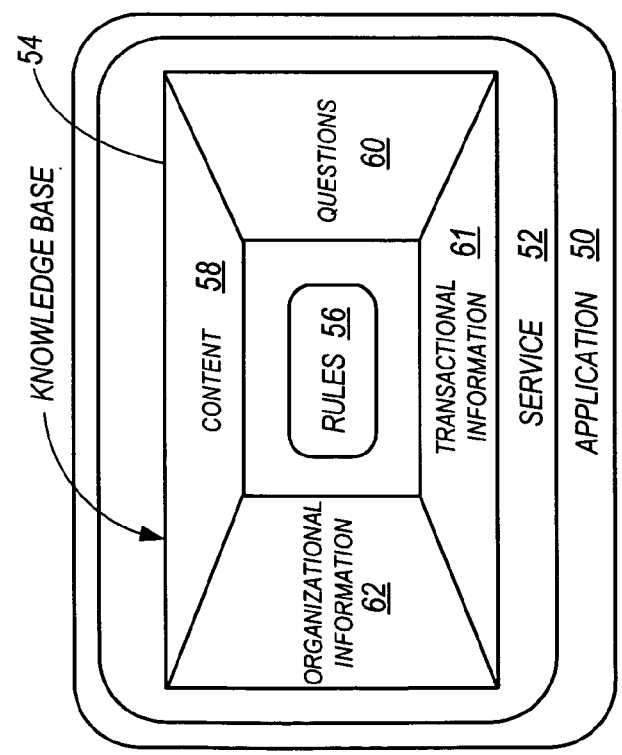
FIG. 2 is a schematic illustration of the relationships of an application or system (front and back end), a service implementing an embodiment of the invention, and an exemplary knowledge base.

FIG. 2 illustrates one way of viewing the relationship between components in a system using aspects of embodiments of the invention. An application 50 (which may include both a front-end system and a back-end system) interacts with a service 52 (which is also shown as including components of the system 10 in FIG. 1). The service 52 obtains information from a knowledge base 54. The knowledge base 54 includes rules 56 required to select and generate a document, a question set, or a style sheet; content 58 that makes up a document (the content may come from a user of the system 10 or a vendor of the service 52 and knowledge base 54), questions 60 (such as supporting resources such as detailed information about data requirements) for a user interface, transactional information 61, and organization-specific data 62 (i.e., information regarding the entity that is using the system 10, such as a Bank, technical writing service, publishing company, etc.) that is common to all transactions.

Figure 3:
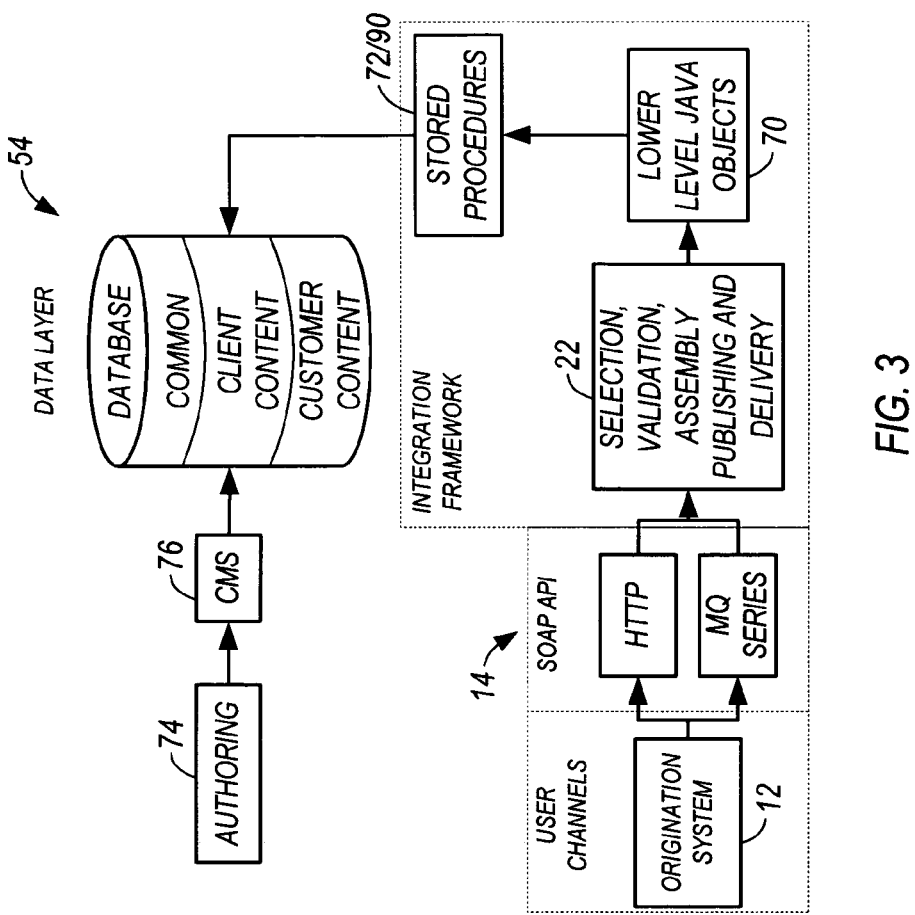
FIG. 3 is an illustration of the communication between an origination system (or front end), an integration framework or engine, a knowledge base, and an authoring system.

FIG. 3 illustrates how information is input into or stored in the knowledge base 54 (or more specifically the content 58 in the knowledge base 54). Information may be delivered from the origination platform 12 through the gateway 14 (which in FIG. 3 is shown as a simple object access protocol ("SOAP") API to the document generation module 22. The document generation module 22 accesses knowledge base information via lower-level objects, as shown in block 70. The lower-level objects, in turn, request information via stored procedures, as shown in block 72, which may be incorporated in the knowledge base 54. The knowledge base 54 also receives information from an authoring tool 74, which interacts with a content management system 76.

Figure 4:
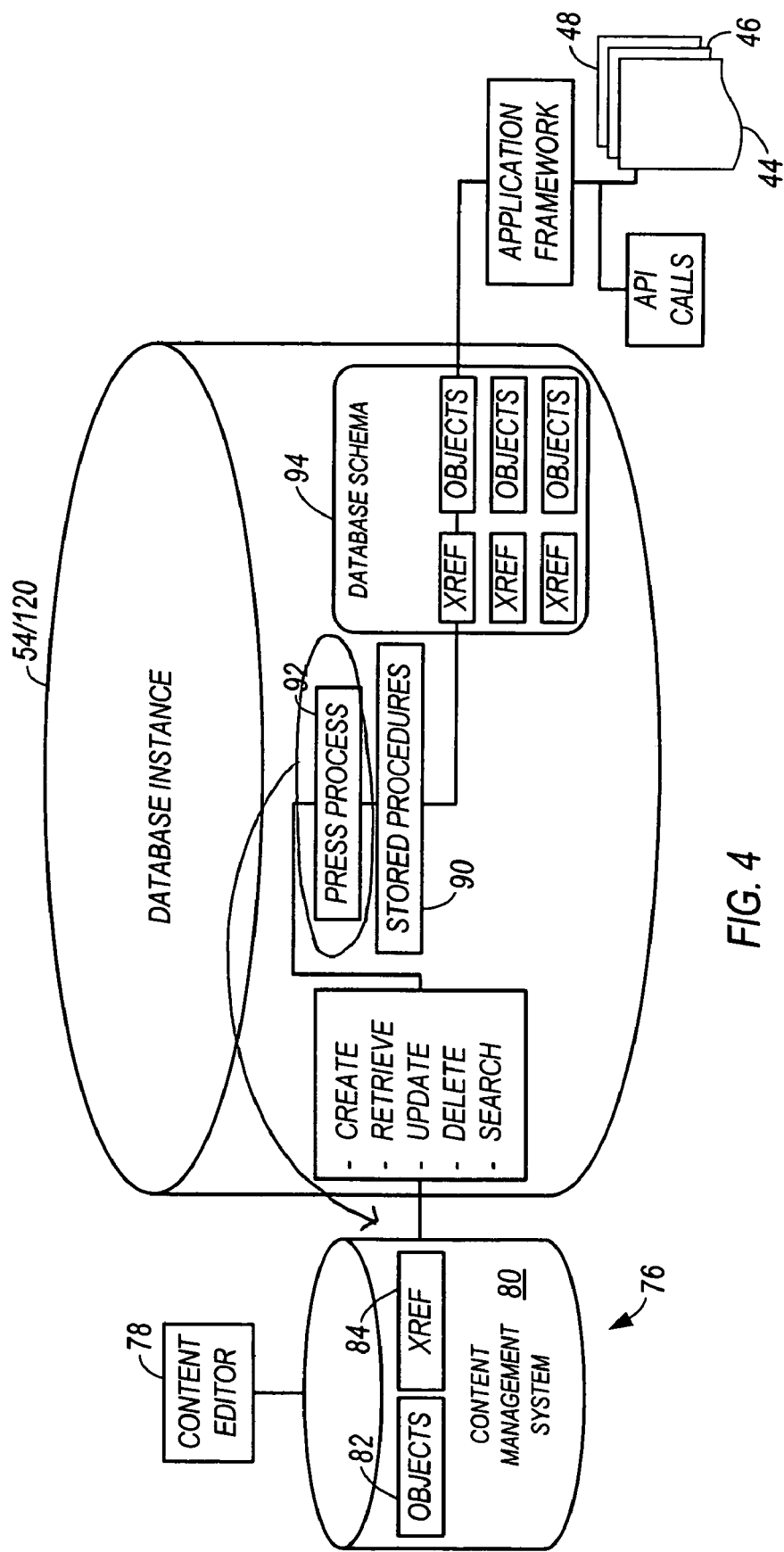
FIG. 4 is an illustration of an exemplary knowledge base and flows of information used to populate the knowledge base.

As best seen by reference to FIG. 4, the content management system 76 includes a content editor 78 (which could be, for example, a tool specifically designed to create XML content or even a simple text editor such Windows Notepad) and a content or data store 80. The data store 80 includes objects 82 and rules and cross reference maps connecting objects, or more broadly, references 84. In one embodiment of the invention, the rules take the form of rules markup created using an XML script or schema (or, more broadly, an architecture or namespace) and may be referred to as "xref" embedded rules.

In one embodiment of the invention, an XML schema is used to define a rules markup language. The schema identifies and declares logical relationships in documents. In the exemplary schema, rules are identified by the namespace prefix "rule." An example is set out below.

```
<Tag>
    <rule:Condition ConditionType="EQ" Name="isMinnesota">
        <rule:Description>Sample condition compares ApplicableLawState
to 'MN'
        </rule:Description>
        <rule:Arguments>
            <rule:ExternalData EntityRef="ApplicableLawState"/>
            <rule:Constant>MN</rule:Constant>
        </rule:Arguments>
    </rule:Condition>
</Tag>
```

In an exemplary implementation of the rules markup language, each element in the markup language is described individually. An element may be described using a content model, and the available attributes and their meanings. Each element may be defined using a table of descriptive information such as the one below.

| Element Name | RuleBase Type |
| --- | --- |
| Derives from | DatabaseObjectType |
| Can be contained by | |
| Content | EMPTY |
| Content Model | |
| Attributes | RuleType |

"Element Name" is mandatory and is the name of the element. "Derives from" may be inapplicable to the element (if it is a root-level element, for example) or the name of another element if an element derives from another element. An element that is derived from another element can have any attributes defined for the parent element as well as its own set of attributes.

"Content" describes what can be contained in the element. Possible values include:
  EMPTY—if this element must always have no child elements.
  Type—if this element can contain data, the "Content Model" will define the data type
  Elements—if this element can contain other elements. The "Content Model" will specify which elements can be contained.

"Content Model" provides additional information about "Content" and is written in standard DTD notation; e.g. (+) indicates one or more, (?) indicates optional, (|) indicates alternatives, etc.

"Attributes" lists any attributes that can be specified for the element in addition to any derived from a parent element. If the element has any attributes, a table, such as the one below, may be used to describe those attributes.

| Attribute Name | Data Type | Possible Values | Default Values |
| --- | --- | --- | --- |
| Name | NMTOKEN | | Optional |
| Uuid | String | | Optional |

"Attribute Name" is the name of the attribute and is mandatory.

"Data Type" can be String, Integer, ID, NMTOKEN or NMTOKENS.

"Possible Values" lists any constants that have been defined for the attribute.

"Default Values" provides a place to record the default value for the attribute. If no default value has been specified in the schema, the constant "None" should be used. "None" is not, in preferred embodiments, a default value.

Using rules markup it is possible to define conditions (using a conditions element) and attach them to an XML element. In the exemplary embodiment, a condition is a Boolean logic structure that evaluates to true or false. It is also possible to define a choose structure (or choose element), which is a set of alternatives along with conditions for choosing an alternative in the set. Iterators (or iterators elements), a structure that specifies the dependency or repetition of content on or from the characteristics of transaction data, may also be defined. In addition, functions (or functions elements) may also be defined. Functions provide a way of specifying data manipulations or transformations.

Elements in the rules markup language may have one of several content ancestries. For example, in one embodiment it is possible for an element to inherit a database object type model. The database object type content model is an abstraction and, as noted, provides information about the type of information the element can hold. A database object type element can contain description and keyword child elements.

It is also possible for an element to inherit a rule base content model. Again, this is an abstraction. A rule base type element is derived from a database object type element and may include a number of possible attribute values, including an Xpath, external data or interface, and internal data or interface. An external interface element provides an interface between the rules and other data sources not available inside the document. It is used to identify data by name so that the data can be evaluated by the rules without requiring the rules to be aware of how the name will be resolved. A resolution of an external interface element may be a single value, a set, an XML DOM node, or an XML DOM list (DOM's are explained below).

An external interface element may have what is referred to as a param or parameter content model. The parameter element is used to provide additional information about an external interface element data request.

An external interface element may also have several attributes including an entity reference attribute and a return type attribute. An entity reference attribute is used to specify a named data item, such as the name of a borrower, loan amount, or applicable law state from the transaction data. A return type attribute specifies the type of storage object to be returned, such as XML, array, string, number, etc.

The content management system 76 interacts with the knowledge base 54 (again, more specifically the content 58). As noted, the knowledge base 54 may include a number of stored procedures represented (in FIG. 4) by block 90. A press process (represented by block 92) in conjunction with the stored procedures 90 takes information from the content management system 80 and stores the information such that individual rules are associated with individual objects. Objects are stored along with cross reference maps as shown in block 94. As a consequence, the content (objects) stored in the knowledge base 54 includes data elements, rules, and language (actual text or content of a document). A data element is a construct that may include rules and text. The content is used, for example, as described with respect to FIG. 1, to create documents such as the documents 44, 46, and 48.

The press process 92 may be aware of multiple schemas, DTDs, or other file formats or architectures. In the embodiment shown, the process of creating or populating the knowledge base 54 includes the pairing of XML content or information with a schema, DTD, or the like. If an object 82 created via the content management system 76 conforms to one of the architectures known to the press process 92, it is inserted or stored in the database via the stored procedures 90, as shown in block 94. The stored procedures 90 allow for consistent manipulation of the knowledge base 54. The knowledge base 54 can store XML, binary, and other objects. In part, this is due to the structure of the knowledge base 54 (discussed in more detail with reference to FIGS. 7A-7D) which reduces or limits responsibilities of the database or knowledge base 54, in the sense that attributes are tracked with the database rather than individual objects.

Figure 4A:
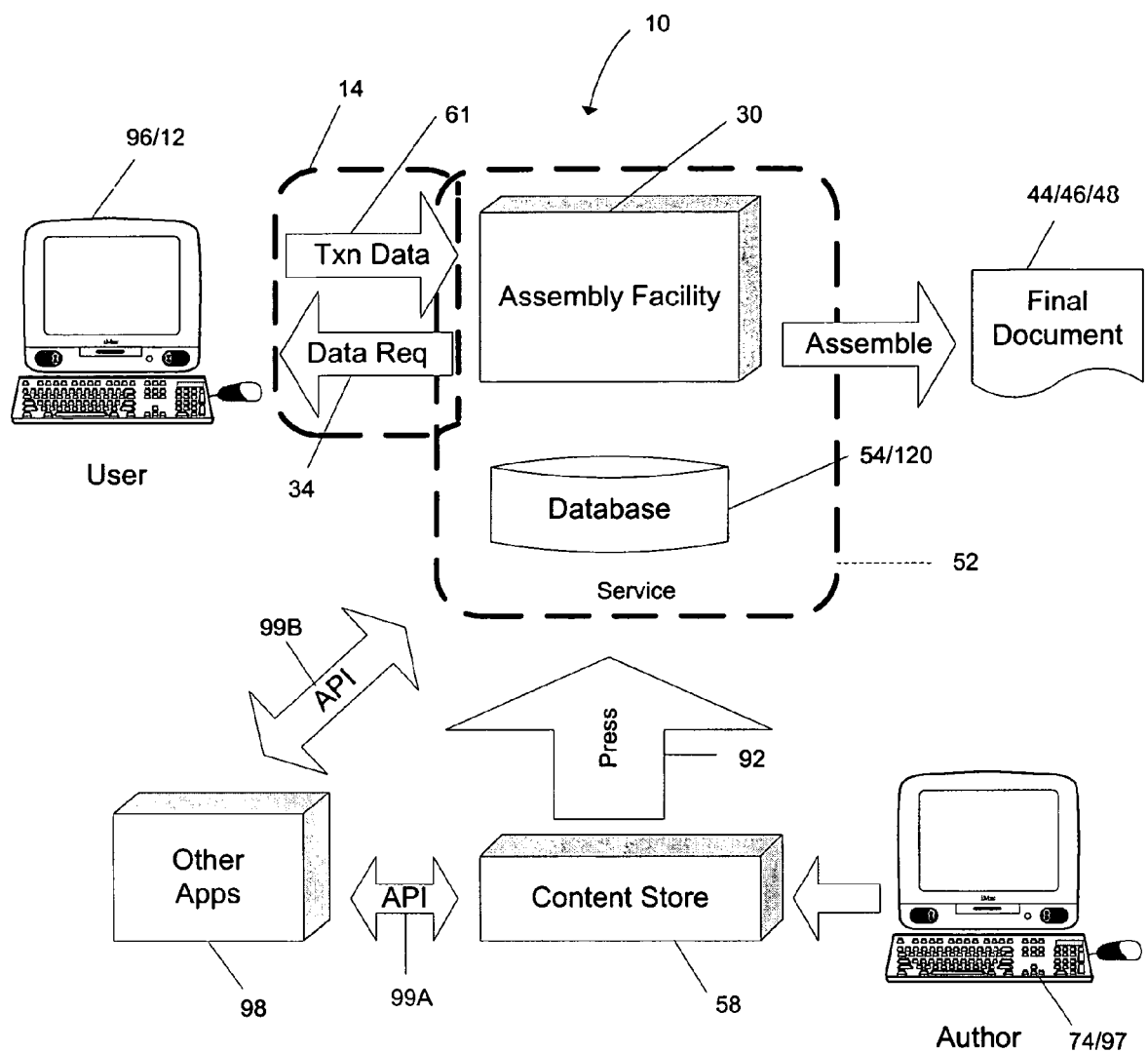
FIG. 4A is an illustration of a system of one exemplary embodiment of the invention.
Figure 7A:
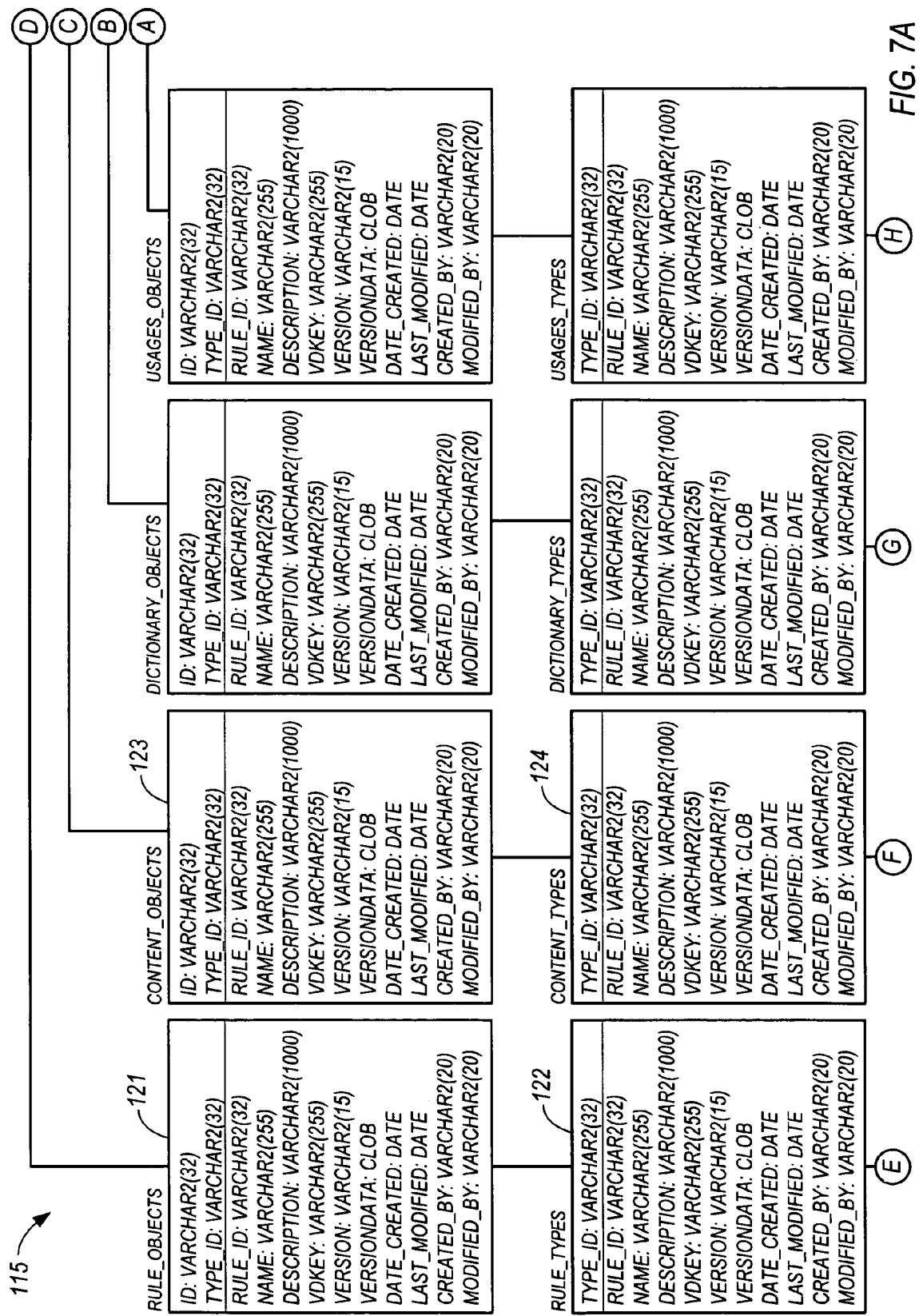
FIGS. 7A-7D comprise a schematic illustration of a database model for a knowledge base used in embodiments of the invention.
Figure 7B:
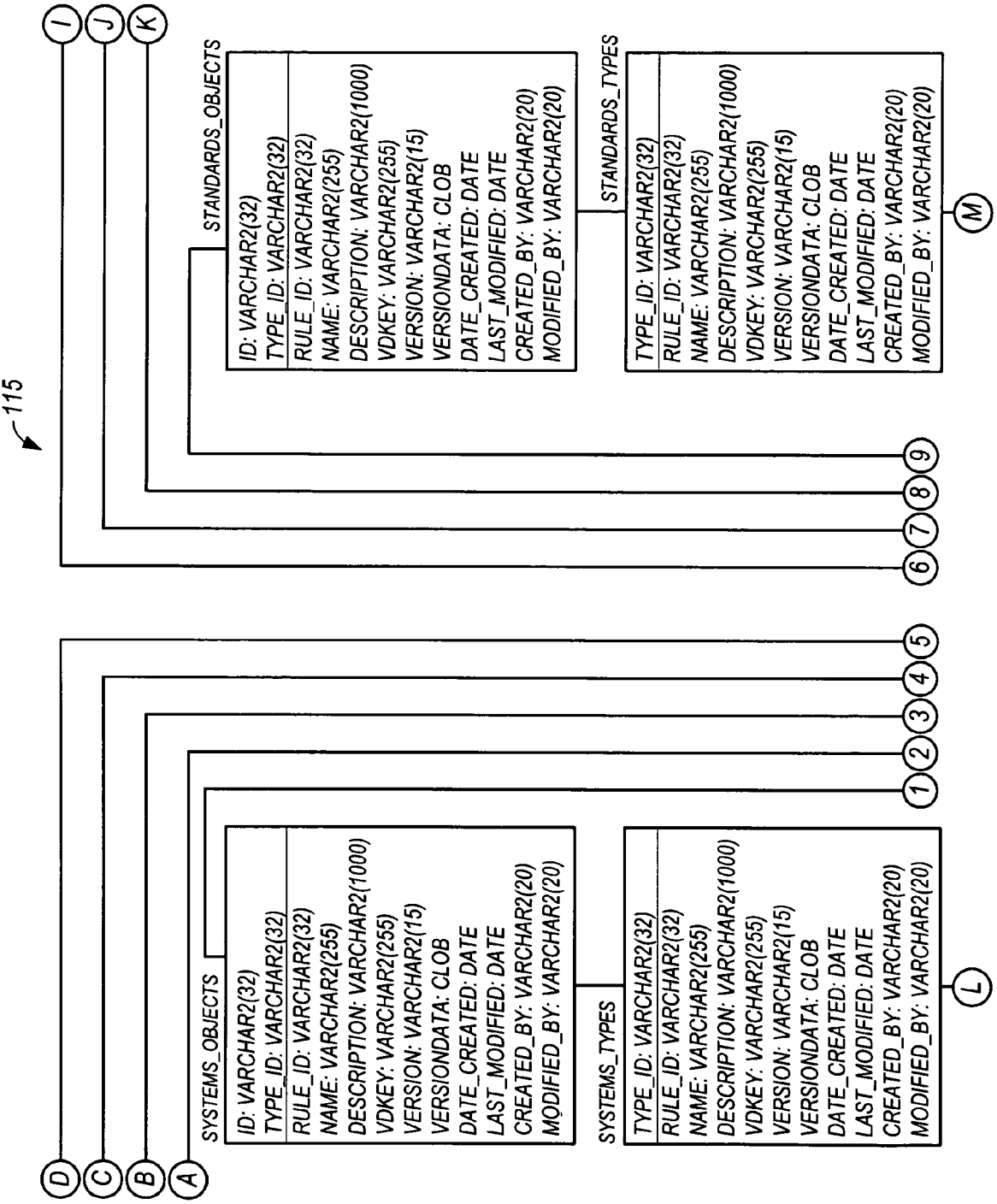
Figure 7C:
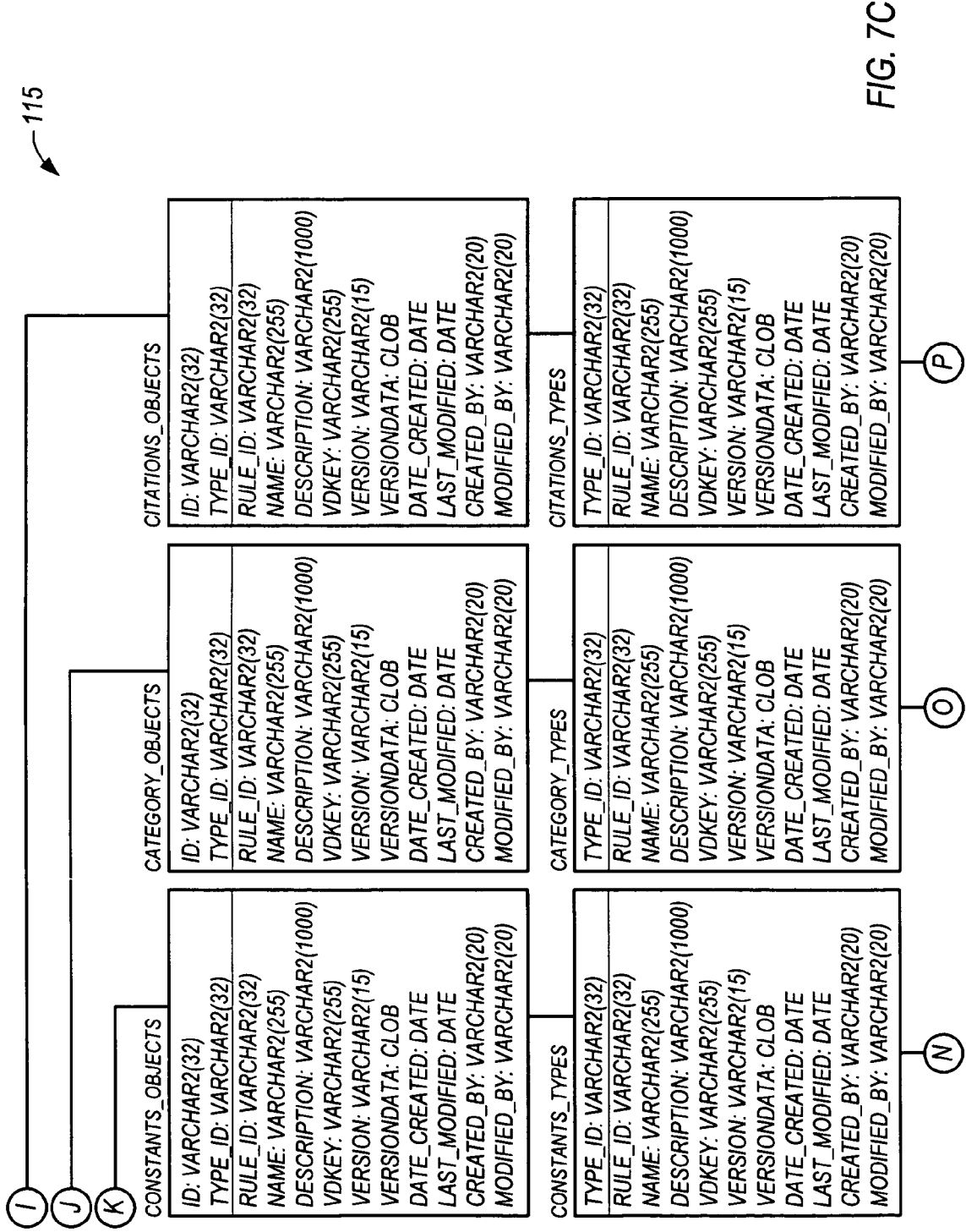
Figure 7D:
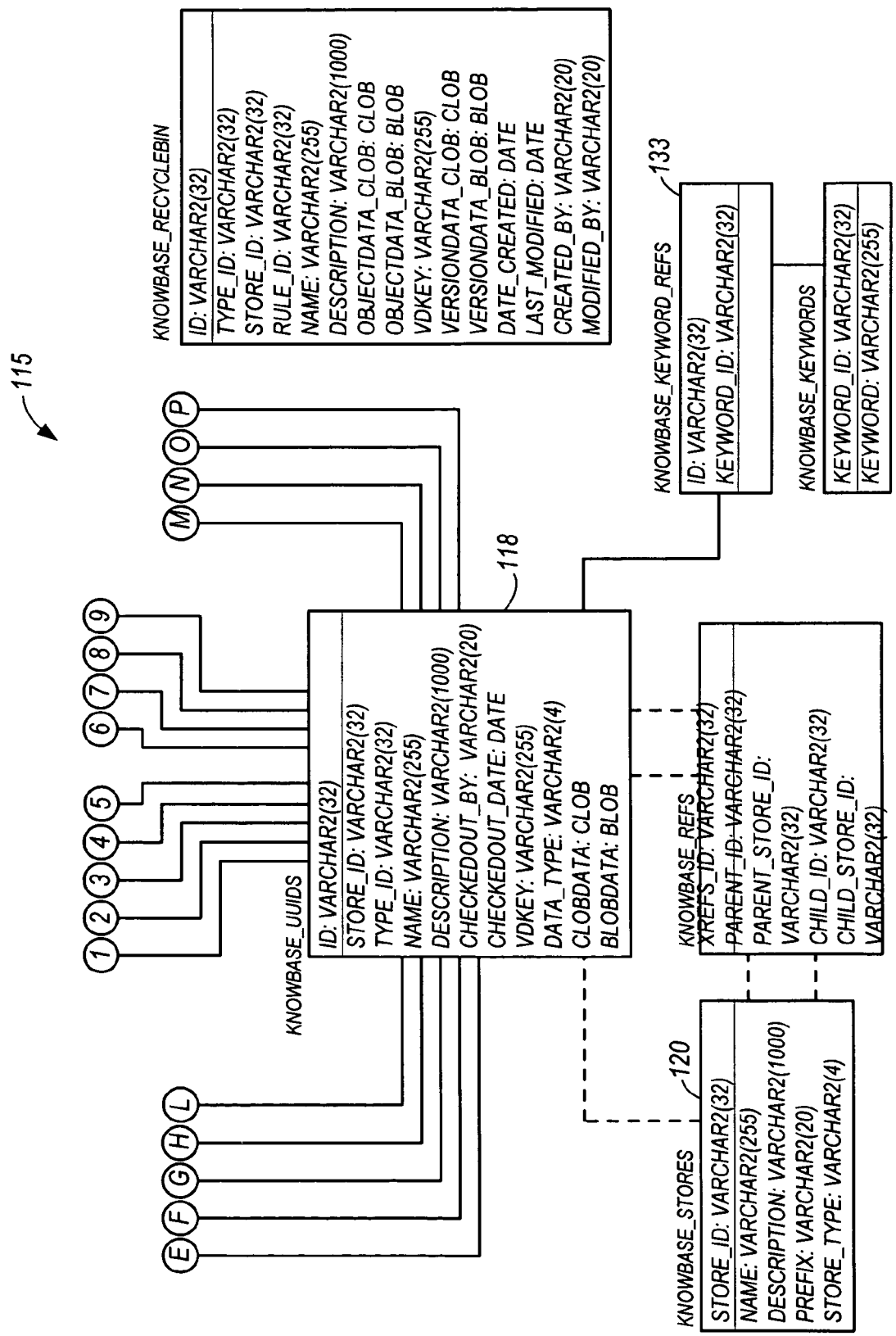

FIG. 4A provides another illustration of the system 10. A user 96 interacting with the origination platform 12 enters transaction data 61 (which may include, for example, a transaction identifier) which is delivered via the API gateway 14 to the services 52. Any data 34 that is required by the services 52 (such as data requested by the data requirements or questions module 34) is sent back to the origination platform 12 via the API gateway 14. The assembly module 30 retrieves data or content and rules from the knowledge base 54 and assembles the content to create documents (such as documents 44, 46, and 48). Content for the knowledge base 54 may be generated by an author 97 using the authoring tool 74 to populate a content store (such as the content 58). Content from the content store is delivered to the knowledge base 54 via the press process 92. Content may also be retrieved from other sources 98, such as legacy databases, other databases, or applications. Various APIs 99A and 99B may be used to transfer the data in the other sources 98 either to populate the content store 58 or to be sent directly to the knowledge base 54.

As noted above, embodiments of the invention implement or follow a precedence when assembling document components into a document. In embodiments of the invention, precedence provides a hierarchical control of content to match business preferences. Precedence provides for customer or organization established hierarchies controlling how organization tailored content overrides are evaluated against alternatives, and the nesting of content to arbitrary depths within hierarchical relationships. This concept is illustrated in FIG. 6, which illustrates a document 100 including various components, such as a section 102, paragraphs 104, and sentences 106. FIG. 6 also illustrates two component assemblies, an assembly 108 and an assembly 110, and a piece of override content 112. The component assembly 108 represents a document that is assembled based upon the default rules in the knowledge base 54. The component assembly 110 represents a document assembled using precedence, resulting in the exclusion of components 114 and 116 of component assembly 108 and the inclusion of component 112.

Precedence may be further understood through an example. An institution such as a bank or credit union (e.g., our fictitious SecondNationWide Bank) may have different lines of business (lending, home equity, etc.). Within a given line of business (like lending), the institution may offer different products and services, such as those it offers commercial enterprises and those that it offers to consumers. Different documents are used for transactions that make up those products and services. The situation may be modeled with a tree diagram, such as the one below.

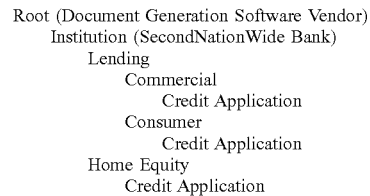

Using the precedence concepts explained herein, the above-illustrated tree can be applied to an element within a document. For example, in a consumer-lending document, the "boilerplate" content may be the content provided by the document generation system software vendor. However, the software user, for example, SecondNationWide Bank, may wish to modify or override that content to suit its own needs. For example, the user may wish to change or replace paragraphs or sections, add content, etc. These overrides may happen at different levels (line of business vs. a specific product). Precedence acts like a series of transparencies that, when stacked, produce the correct document tree for the given document by looking at the elements that are "on top."

As is known, when XML documents are processed in an XML processor a document object model or DOM is created. As is also known, a DOM may be represented as a tree structure with a number of nodes. A node may be an element (such as a root element), processing instructions, an attribute, an attribute value, and namespaces. As a consequence, when a document component or, more broadly, a data structure configured according to embodiments of the invention is processed by an XML processor, processing begins at the root node (as with any other XML structure), which has the lowest precedence. Precedence is applied to override objects of low precedence with objects of higher precedence when applicable.

In some embodiments of the invention, implementing precedence requires that no content be duplicated (that is, content objects are reused), and that the content of the software vendor be read-only. When editing or overriding an object (assuming it's not locked or read-only to prevent editing), a new copy is created with a precedence level equal to or higher than the precedence of the original object. For example, a content editor at the institutional level may open a vendor-level object for editing, which would then create a new object with the vendor-object as a template. When saving, the editor would have the option to save the new object at the institutional, product line, product, etc. levels, but not at the read-only vendor level. When viewing the objects as in a tree structure, new copies of objects are placed in the tree at the same depth of the subject object or deeper.

Within a precedence level, the name attribute provides a unique key (no two objects can have the same value for their name attributes). This requirement is extended within the precedence concept by requiring that when an object is overridden or edited and placed at a new precedence level, the new object retains the same name as its precedence parent. Thus, object names are unique within a particular precedence level, and it is also possible to extract the precedence stack of an object (i.e., all objects with a particular name, yet at different precedence levels). As indicated, an object at any level can be locked, preventing any higher precedence levels from overriding or editing it.

When an object is edited or overridden at a particular precedence level, the new copy created is used for all documents at or below the given precedence level (unless edited or overridden again). In reference to the exemplary tree structure, given two documents at the institutional depth, one document cannot have a vendor-level element while another document has its institutional-level override (both documents would use the institutional-level override). Since editors select objects based on their name, when a particular object is selected, what is provided is the precedence version of the given object that is deepest in the precedence hierarchy, but not deeper than the position of the document being edited. Individual objects (at different precedence levels) should maintain their own version histories, as it is desirable to have the vendor update the base content and be able to propagate new versions (which replace the vendor objects, not any precedence overrides or modifications).

Precedence is based, in part, upon the hierarchy used in the knowledge base 54. FIGS. 7A-7D illustrates an exemplary object relational data model 115 used in embodiments of the invention. As can be seen by reference to FIGS. 7A-7D, a unique user identifier table or object 118 (FIG. 7D) is the parent to the other tables or objects in the model. Among other attributes, in the embodiment shown the object 118 includes "clobdata" (character large object data) and "blobdata" (binary large object data). The object 118 is associated with a master stores table 120, which includes a listing of the available stores in the knowledge base 54. In the example shown, the stores include a rules object store 121 and a rules types store 122; a content object stores 123 and a content types store 124; as well as a dictionary objects store, dictionary types store, usage objects store, usage types store, systems objects store, systems types store, standards objects store, standard types store, constants object store, constants types store, category objects store, category types store, citations object store, and citation types store. The number and types of stores are application dependent although having separate content and rules stores 121, 122, and 123, 124 provides advantages in some embodiments of the invention. Further, in the embodiment shown, the object/type table pairs (e.g., 121 and 122) correspond to the XML schema and each type corresponds to an element in the schema. In other words, every element becomes a type within a store. A review of the model shows that at most each object has one parent and no more. The use of an object relational data structure rather than a conventional relational database means that the knowledge base may be implemented without the numerous tables (often one-hundred or more) and the complexity that comes with using so many tables in such conventional databases.

Figure 8:
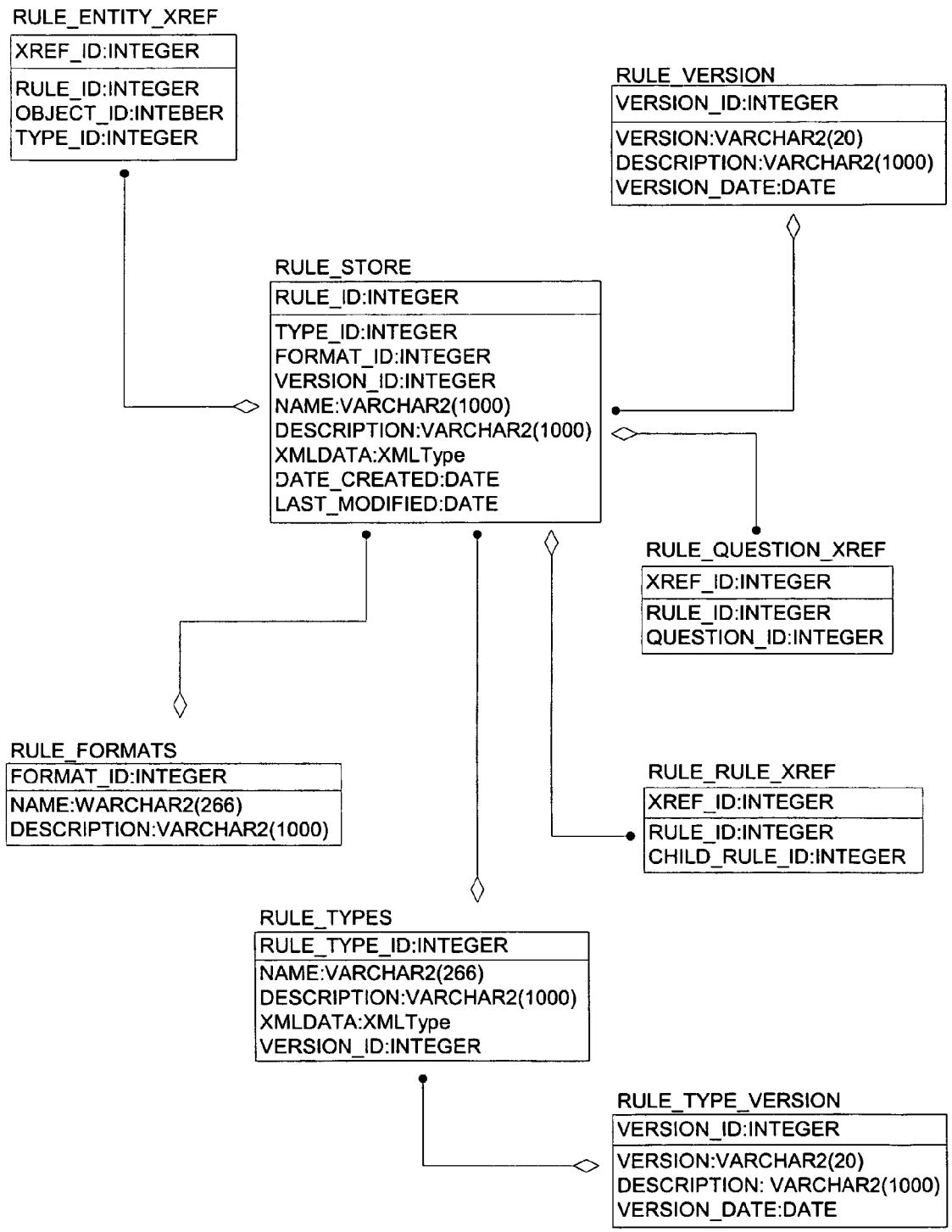
FIG. 8 is a schematic illustration of a model for rule stores.

In embodiments of the invention, the rules 56 are structured in a decomposed fashion (see FIG. 8). An additional advantage of such a complimentary use of the object/relational paradigm is that rows in the relational tables (or object store) may contain a link to either an external object, or an internal binary or character object. Each binary or character object in a row may be composed of XML text fragments that can be processed to create a document. Each row is then cross referenced to another row within the same table structure to create a parent-child relationship without having to parse an XML tree during runtime processing. Cross reference tables (or bill of material structures) are created when the document objects are stored. This reduces or eliminates the requirement of having to open and interrogate each XML object prior to knowing if it needs to be included in the document. This allows for parent-child relationship re-assembly without reading each component.

Having described the exemplary system 10 and features of embodiments of the invention, additional details regarding various aspects of embodiments of the invention will now be provided.

In some embodiments of the invention, document content may be configured in one of several XML structures. One of these structures may be a package of document selection rules (such as rules 56/84) used to determine a set of documents. Another structure may be a dynamic document that can resolve to one or more instances of a given document. A third structure may be a static document that is resolved to one or more static forms. A static document generally includes at least some content that is determined before and some content that is determined during the resolution process.

Figure 9:
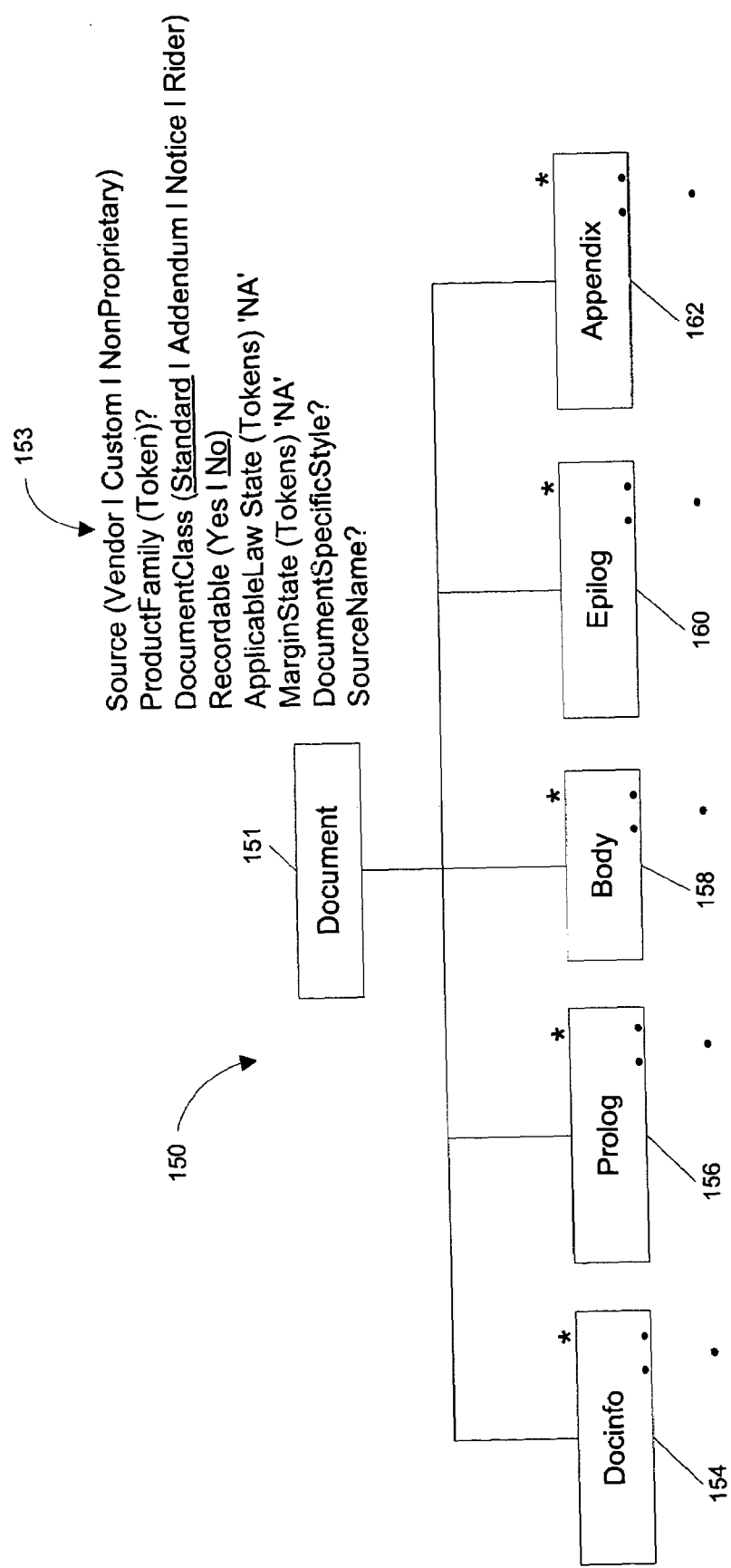
FIG. 9 is a tree diagram of the architecture of a dynamic document.
Figure 10:
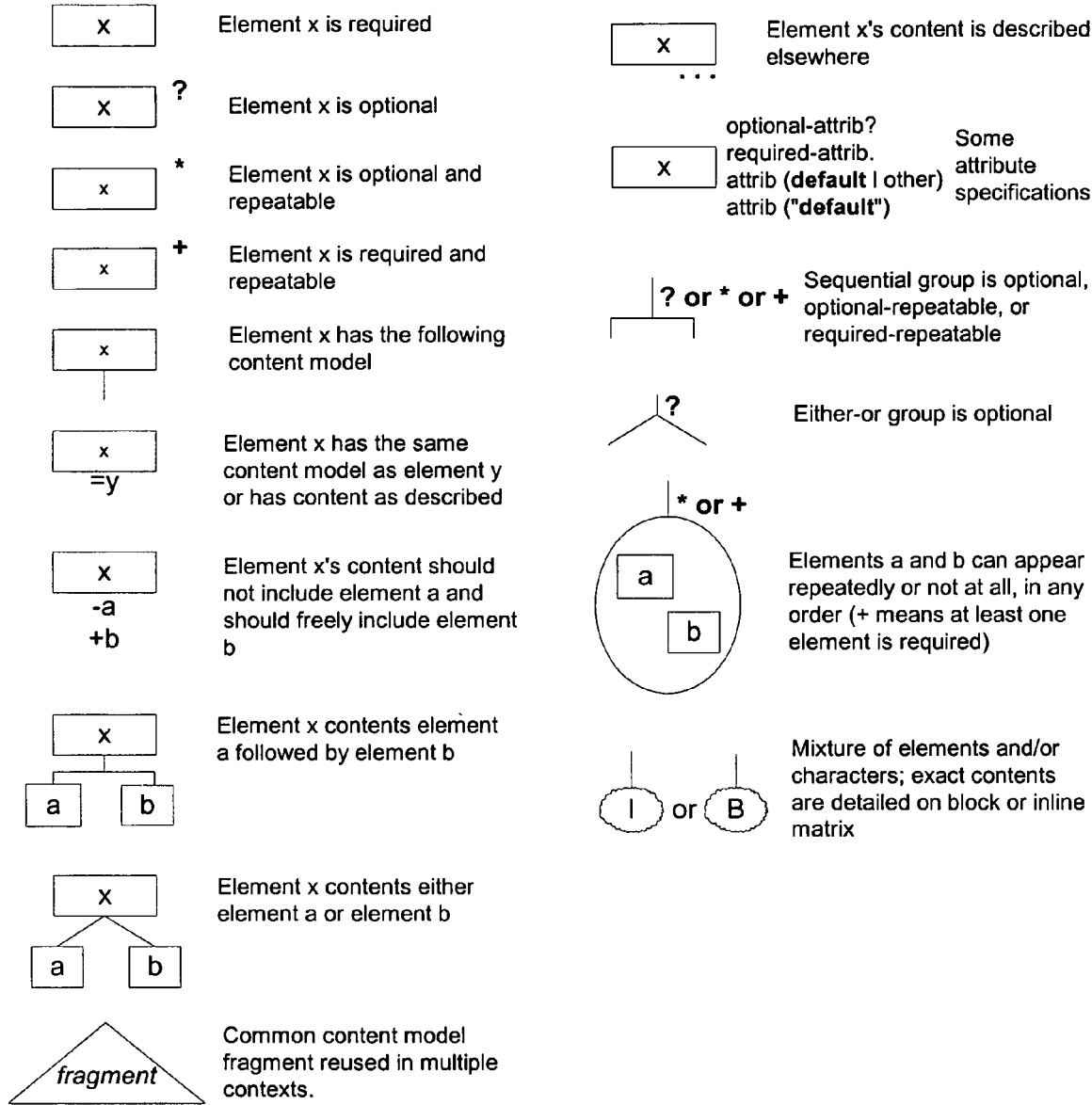
FIG. 10 illustrates a key for tree diagrams included herein.

FIG. 9 illustrates the architecture of a dynamic document 150 that can resolve to one or more instances. The diagram in FIG. 9 is a tree diagram configured according to the key shown in FIG. 10. The architecture of dynamic documents used in some embodiments of the invention can be described by a document type definition ("DTD"). As is known, a DTD is a set of rules that defines the elements and attributes in an XML document that invokes or conforms to the DTD. DTDs include declarations for elements and attributes generally beginning with an XML prolog followed by a document type declaration, element type declarations, attribute declarations, and other components.

As shown, the exemplary dynamic document 150 includes (or is modeled as having) a root element; namely document element 151. The document element includes a number of attributes 153. In the example shown, the attributes include a source attribute, a product family attribute, a document class attribute, a recordable attribute, an applicable law state attribute, a margins state attribute, a document-specific style attribute, and a source name attribute. The attributes 153 may be used for a variety of purposes including to identify the source of particular content (that is who authored, owns, or sponsors the content); to identify the product for which the document was written; to identify whether the document is a standard document, an addendum to another document, a notice, a rider, or other type or class of document; to identify whether a document is intended to be recorded with a registrar (for example, a registrar of deeds); to indicate the state to which the document applies; to indicate specific margin requirements of the state or other government entity; to specify formatting styles; and to identify the name of a document source (using the previously introduced fictitious example, "SecondNationWide Bank"). Generally, information contained in element content and attributes is not used to guide assembly. Instead, embedded rules use externally supplied data to guide assembly.

The document 150 also includes zero or more document information elements 154, zero or more prolog elements 156, zero or more body elements 158, zero or more epilog elements 160, and zero or more appendix elements 162. The elements 154, 156, 158, 160, and 162, in turn, may include their own attributes and sub-elements. Because the creation of a DTD is generally dependent on the specific circumstances for which an XML solution is being developed only a portion of an exemplary DTD that describes the document 150 will be described. It should be understood, however, that in light of the teachings provided, one of ordinary skill in the art would be able to understand how the exemplary DTD operates in connection with other components of the embodiments described herein.

Figure 11:
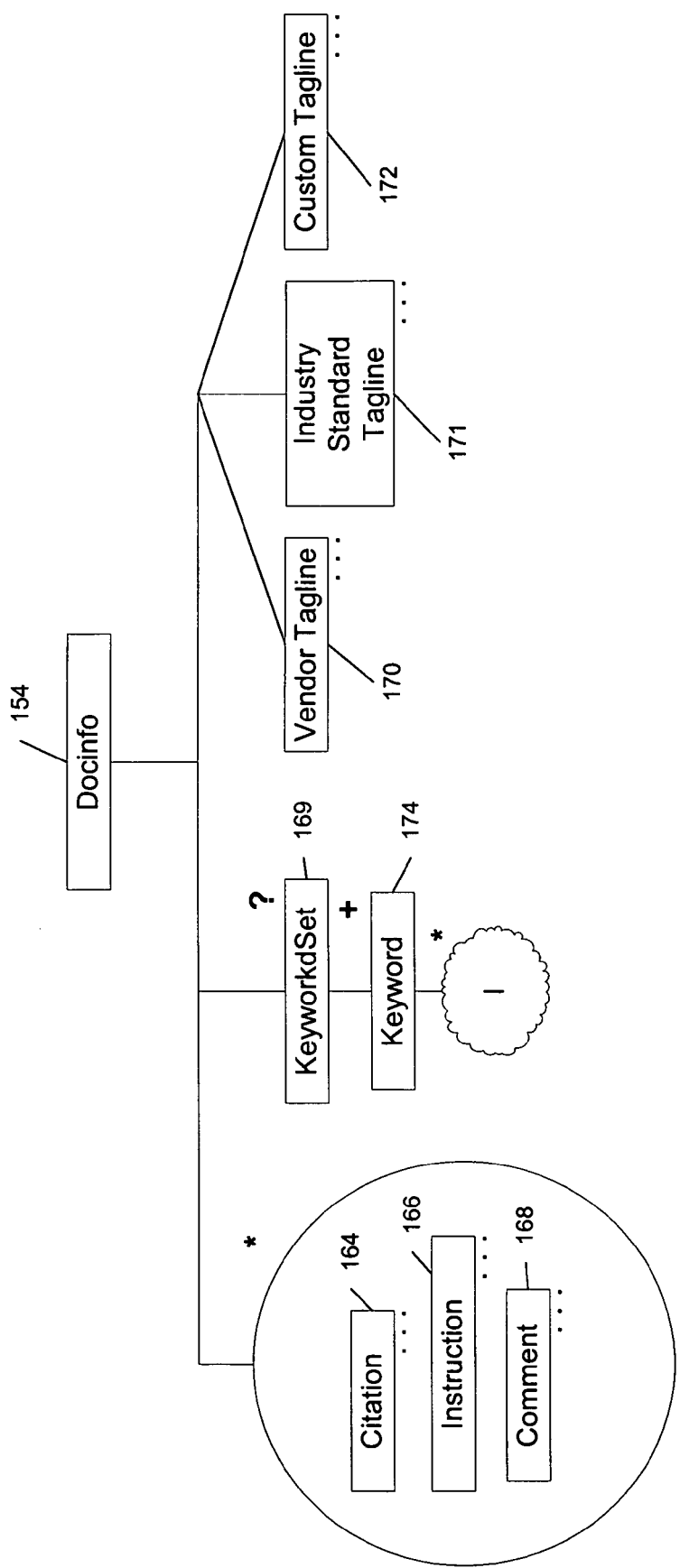
FIG. 11 illustrates the architecture of a document information element.

FIG. 11 illustrates the document information element 154 in greater detail. The document information element 154 may contain a mixture of zero or more citation elements 164, zero or more instruction elements 166, zero or more comment elements 168, an optional keywords set elements 169, and at most one tagline elements 170-172. The tagline elements 170-172 may be used to provide information regarding the source of a particular document such as a proprietary knowledge base, industry accepted standard or custom-created knowledge base or standard. If a keywords set element 169 is included, it must contain a keyword element 174. In the embodiment shown, a keyword element contains a mixture of in-line level elements and parse-able contents known as "#PCDATA" (defined in the key of FIG. 10).

Figure 12:
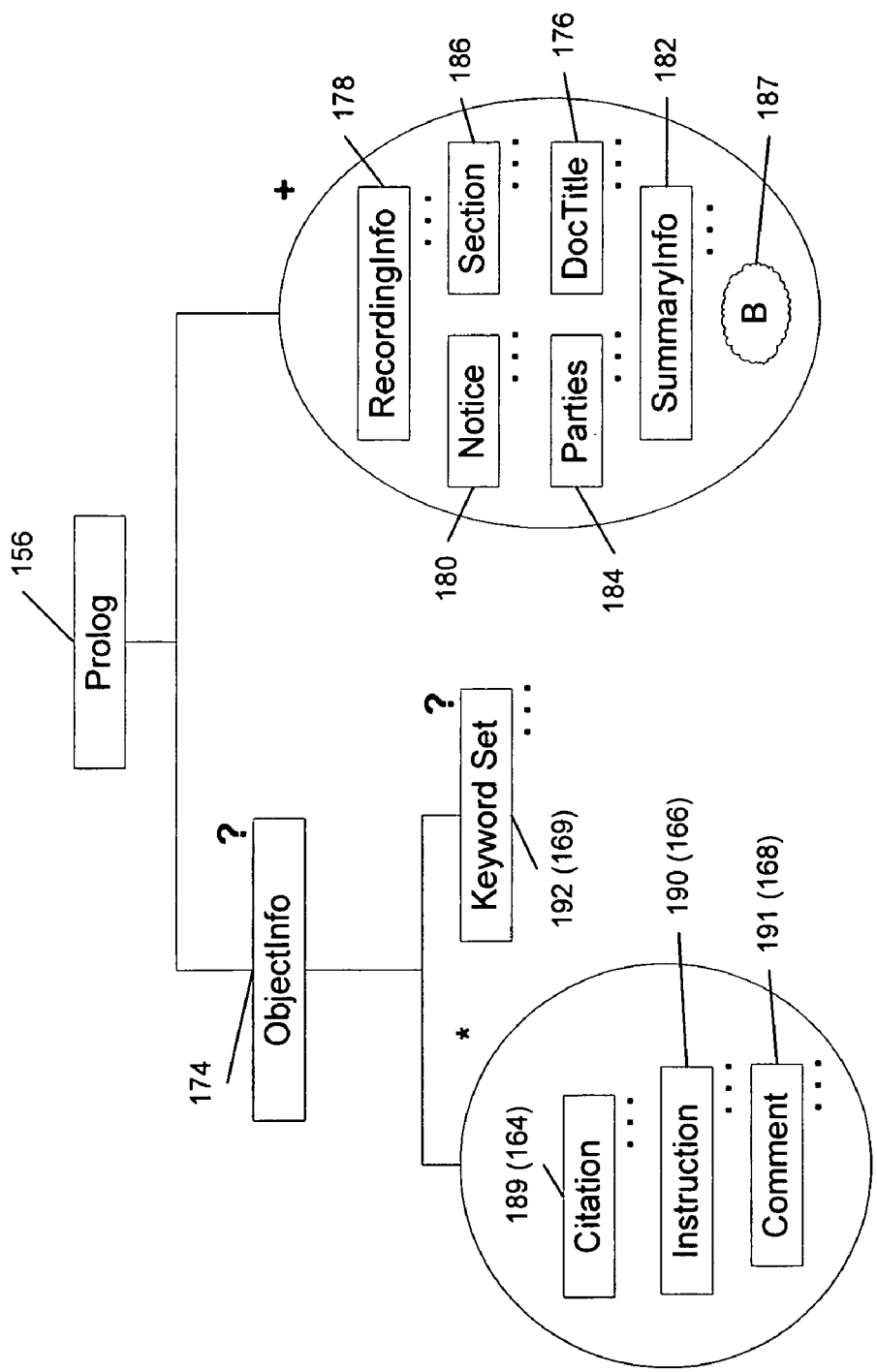
FIG. 12 illustrates the architecture of a prolog element.

FIG. 12 illustrates the prolog element 156 in greater detail. In one embodiment, the prolog element 156 may include an optional object information element 174, and a mixture of one or more document title elements 176, recording information elements 178, notice elements 180, summary information elements 182, parties elements 184, section elements 186, and block elements 187. The object information element 174 includes a mixture of zero or more citation elements 189, instruction elements 190, and comment elements 191, followed by an optional keyword set element 192.

Figure 13:
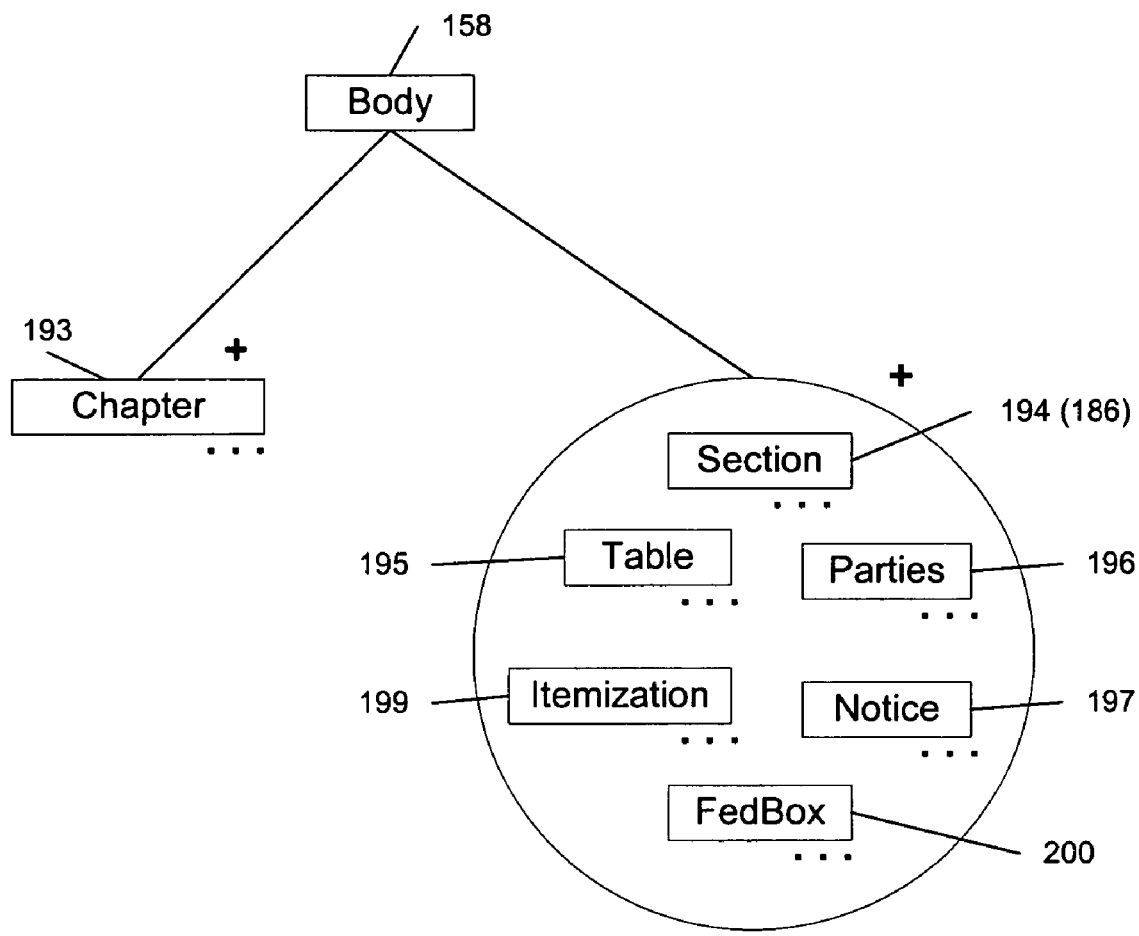
FIG. 13 illustrates the architecture of a body element.

FIG. 13 illustrates the body element 158 in greater detail. In the embodiment shown, the body element 158 contains either one or more chapter elements 193 or a mixture of one or more section elements 194, table elements 195, parties elements 196, notice elements 197, itemization elements 199, or fedbox elements 200, which in the embodiment shown are containers for other legally required, summarized, or detailed information. The fedbox elements may contain loan amount, interest rate, repayment terms, and other values.

Figure 14:
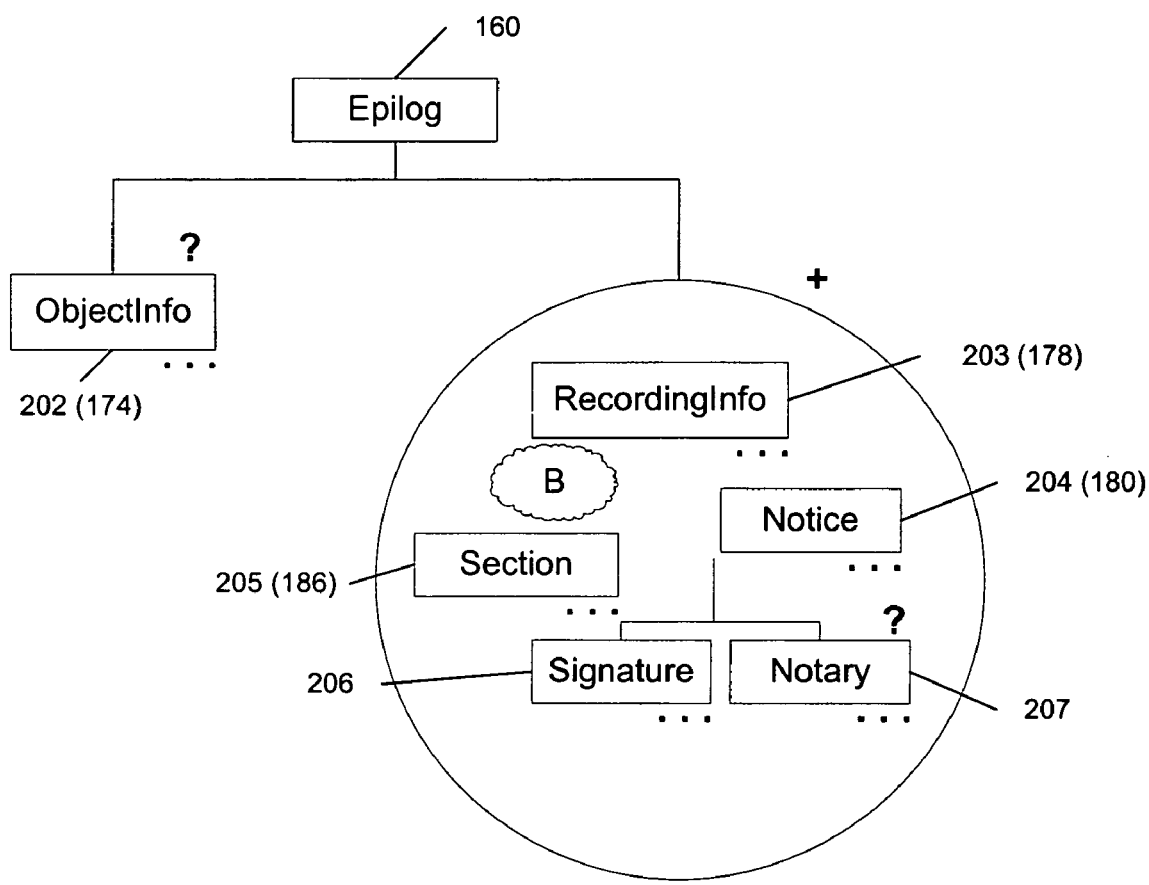
FIG. 14 illustrates the architecture of an epilog element.

FIG. 14 illustrates the epilog element 160 in greater detail. In the embodiment shown, the epilog element 160 includes an optional object information element 202 followed by a mixture of one or more recording information elements 203, notice elements 204, section elements 205, signature elements 206, or elements defined in a block matrix. If a signature element 206 is provided, it may be followed by an optional notary element 207.

Figure 15:
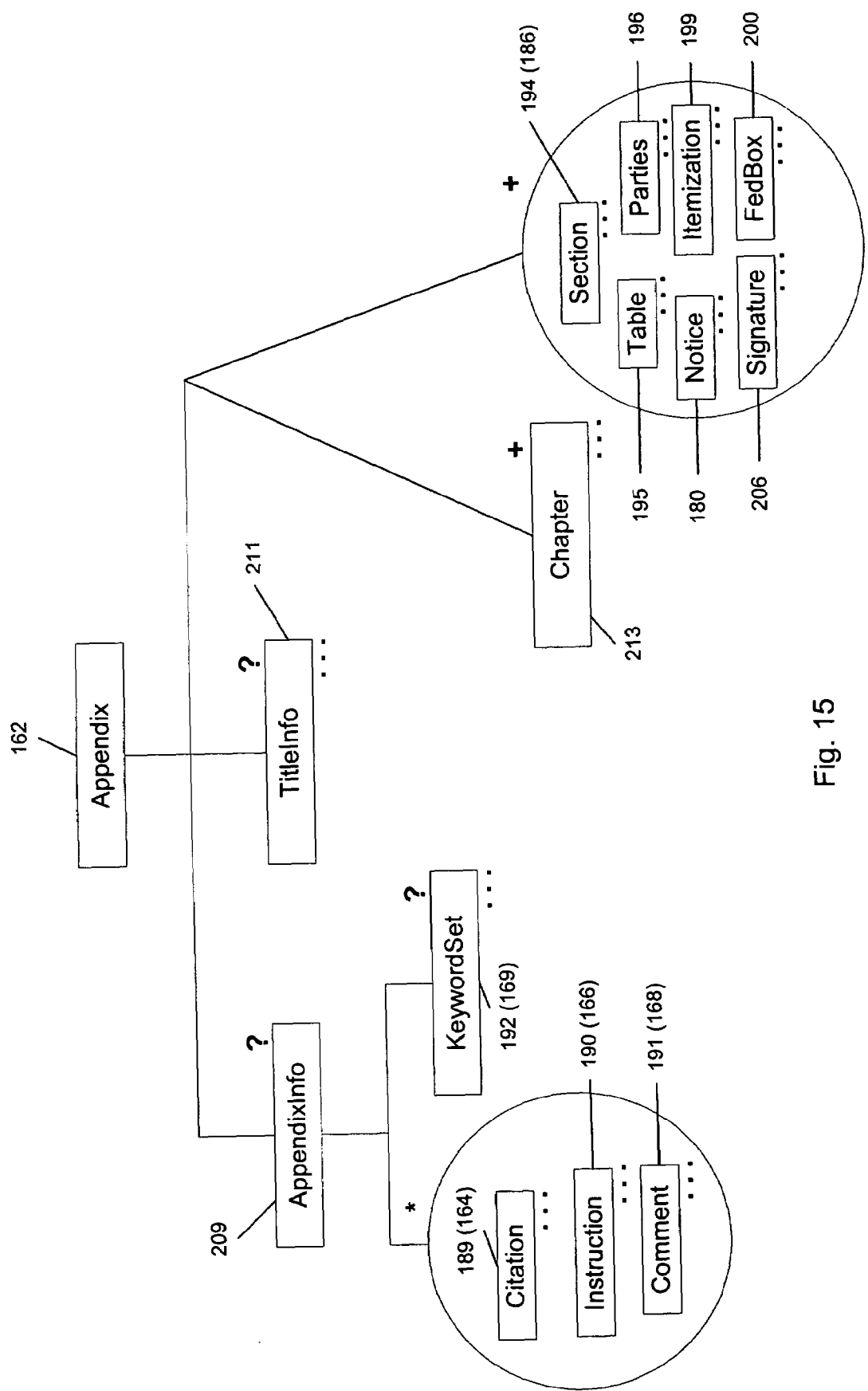
FIG. 15 illustrates the architecture of an appendix element.

FIG. 15 illustrates the appendix element 162 in greater detail. In the embodiment shown, the appendix element 162 contains an optional appendix information element 209, an optional title information element 211, one or more chapter elements 213 or a mixture of one or more table, comment, section, notice, parties, signature, itemization, or fedbox elements. The optional appendix information element 209 includes a mixture of zero or more citation, instruction, or comment elements, and an optional keyword set element.

Figure 16:
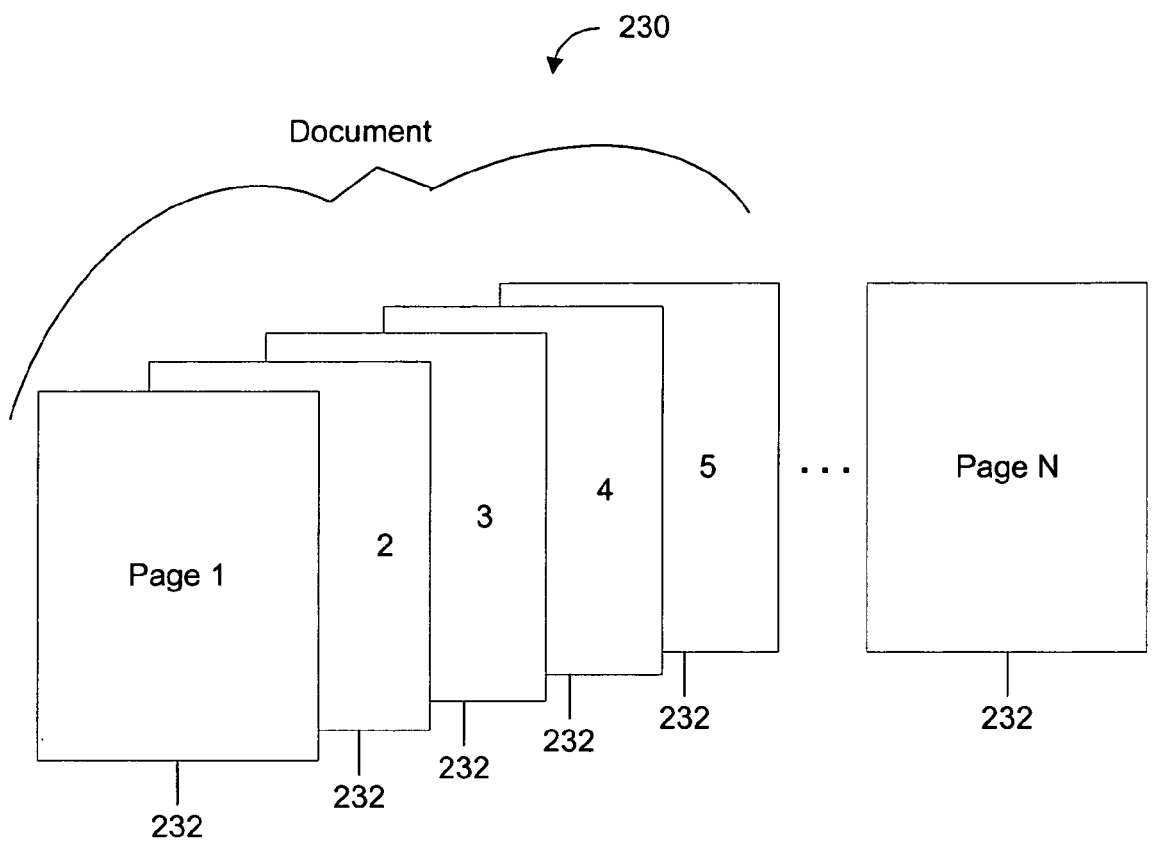
FIG. 16 illustrates an exemplary static document that has a plurality of pages.
Figure 17:
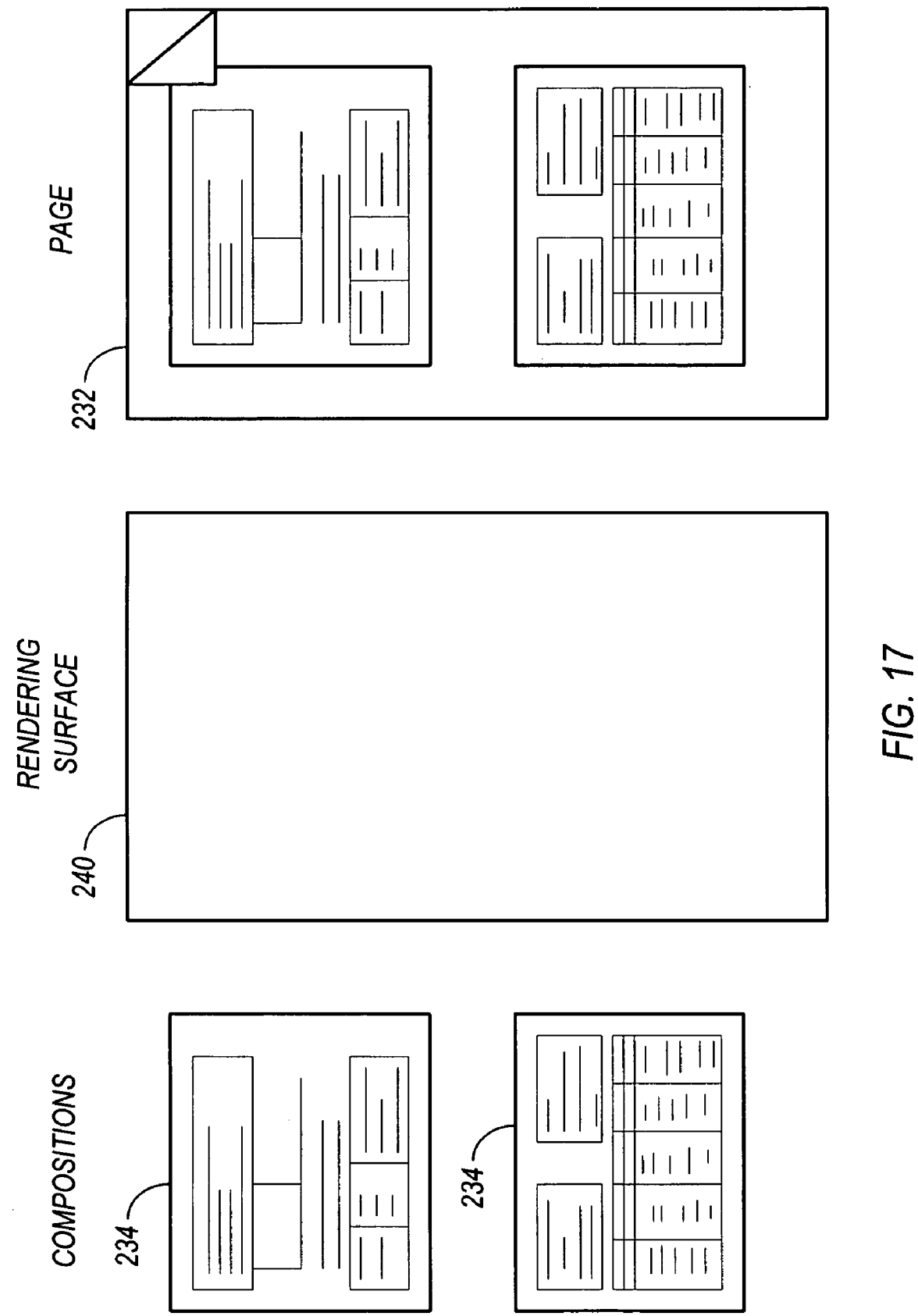
FIG. 17 illustrates laying of compositions on a rendering surface to create a page.

FIG. 16 illustrates an exemplary static document 230 having a plurality of pages 232. In one embodiment of the invention, each page (e.g., one of the pages 232) of a document (e.g., the document 230) is constructed by laying compositions (e.g., compositions 234 and 236) on a rendering surface 240 (as shown in FIG. 17).

Figure 18:
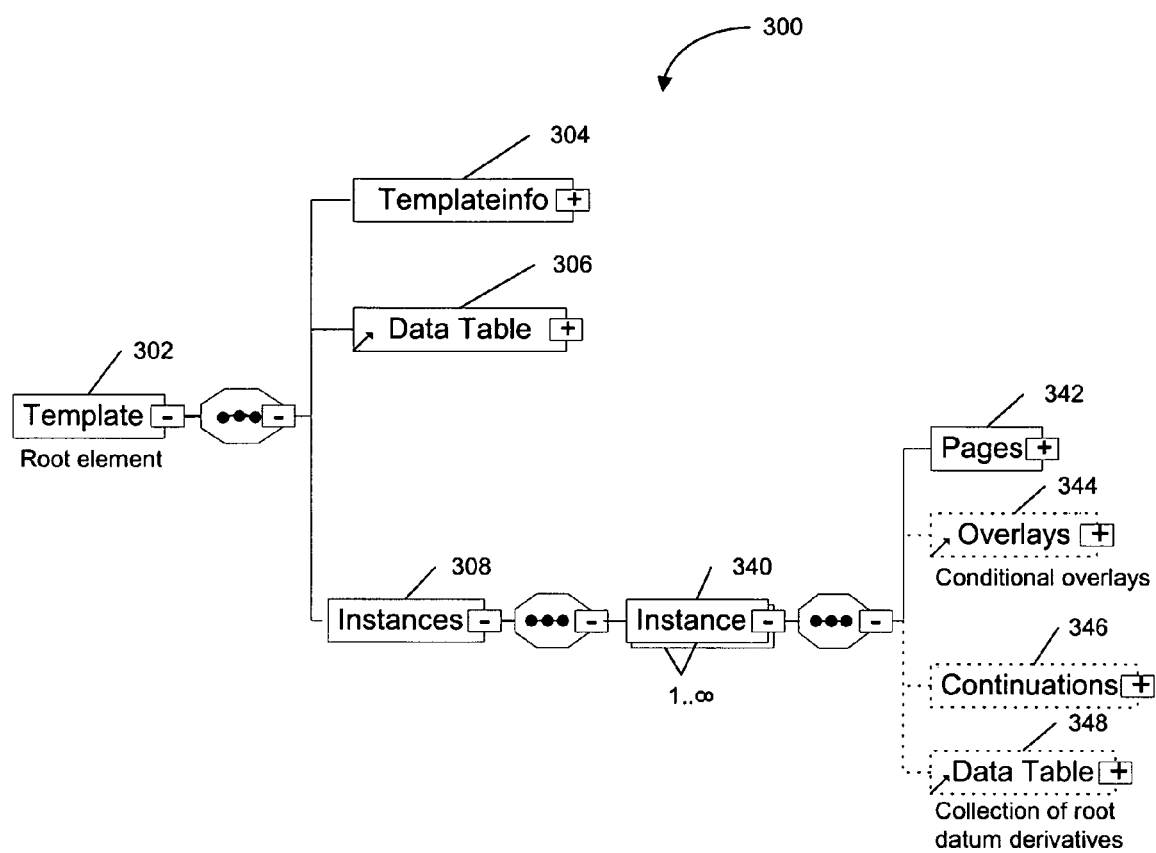
FIG. 18 illustrates an architecture for a static document.

FIG. 18 illustrates a model of a schema or, more simply, a schema 300 for static documents used in embodiments of the invention. The schema 300 includes a root element in the form of a template element 302. The template element 302 contains a number of sub-elements (more commonly referred to as children or child elements), including a template information element 304, a data table element 306, and an instances element 308. The template information element 304 includes descriptive information about the template element 302. The descriptive information can include a title element that contains a title for the document at hand, a description element that is a container for free-form text about the template element, a help text element, which is a container for free-form information that may be useful to a consumer of the document, and a document type element that is provided to support a type element from other schemas or DTDs. In addition, the template information element 304 may include a print constraints element which is a container for special values that may be needed or used by a printing environment.

The data table element 306 includes, in some embodiments, all the data values to be used in a specific instance of a template 302. In one embodiment of the invention, the data table element 306 defines a structure of data values that can be accessed by name, or by a combination of name and one or more indices. The data in the data table element 306 drives the application of business rules to transform an abstract instance of the template 302 into one or more concrete instances and to assign data values to data targets. A data target is a location or area on a composition that can be modified at transaction time. Exemplary data targets include a check box, a text field, a button, or a digital signature placeholder. A data target may have dimensions, presentation characteristics, help text, overflow rules, and other attributes as specified in the applicable schema. The interaction between the data in the data table 306 and the overflow rules drives the usage of addendum pages, their contents, and quantity.

Figure 19:
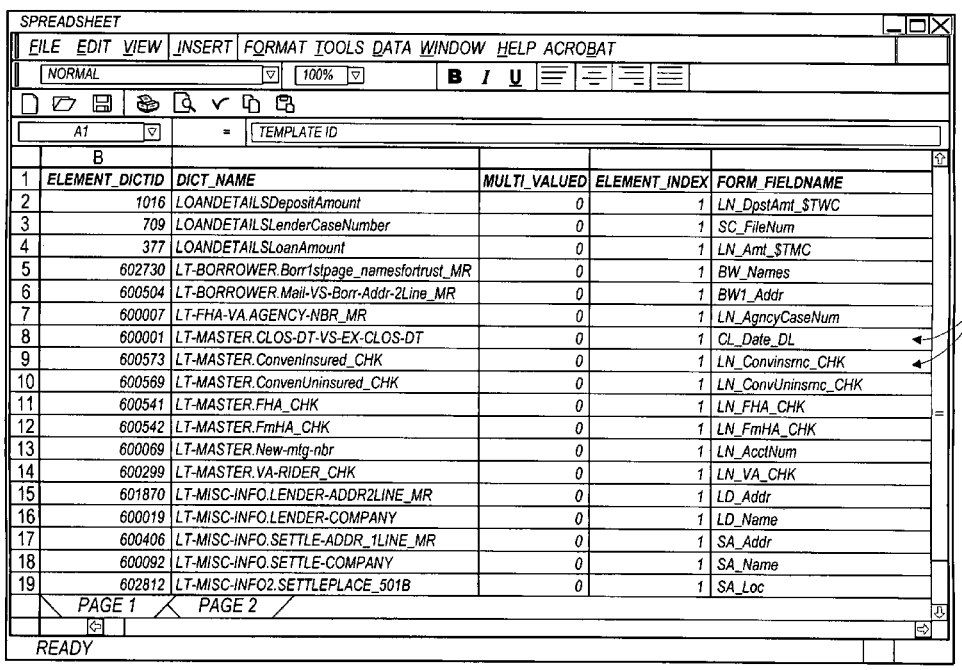
FIG. 19 illustrates an exemplary data table that may be used in an instantiation of a static document.

FIG. 19 illustrates a portion of an exemplary data table 330 having a plurality of data targets 332. FIG. 20 illustrates exemplary XML code for the data table 330. Each piece of data ("Data") is wrapped with an element descended from a "RootDatum" to provide data type and identification information. Each RootDatum can contain a Data element or a Value element or both. Each Data element can contain a plurality of Datum elements and/or a Value.

Referring back to FIG. 18, the instances element 308 describes how each individual instance of the document is constructed. The instances element 308 includes a single instance element 340 at authoring time. The abstract instance is replicated into a plurality of instances at transaction time. In embodiments of the invention, information in the data table may determine the number of instances of a document.

Figure 21:
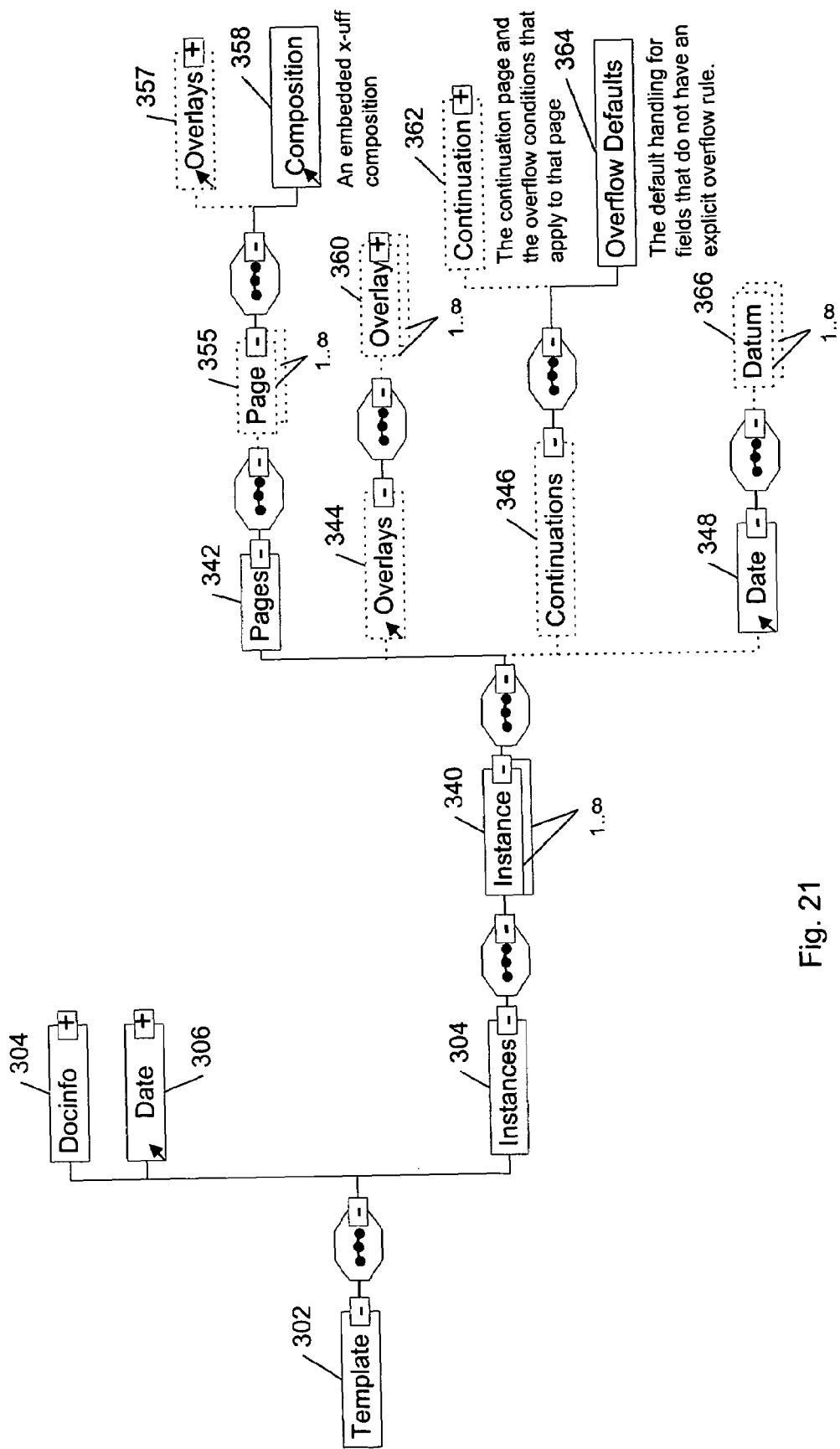
FIG. 21 illustrates the architecture of an instances element.

In one embodiment of the invention, an instance element 340 must include a pages element 342 and may include an overlays element 344, a continuations element 346, and a data table element 348. As best seen by reference to FIG. 21, each pages element 342 may include one or more page elements 355. And, each page element 355 may include an overlays element 357 and one or more composition elements 358. Each overlays element may include one or more overlay elements 360. Each continuations element 346 may include one or more continuation elements 362 and, in one embodiment of the invention, must include one or more overflow default elements 364. Each data table element 348 may include one or more datum elements 366

Continuations elements tell a processor how to handle overflows. An overflow condition can be created when the data value to be assigned to a field target cannot be drawn in the available space according to the attributes governing that space. Overflow handling is defined as part of the contents of an instance element 340. An instance element 340 can have any number of pages, but the overflow handling is independent of those pages. When data for a text target requires more space than is available, a continuation event occurs. Continuation handling falls into three categories. The first of these is a no continuation handling condition, where fields are handled on their original page. Under a no conditional handling condition attributes may specify font reduction that may be applied. The second type of continuation handling is structured handling, where handling of rich data structures such as tables or parties in a tabular format is required on the continuation page. A third type of continuation handling is unstructured handling, where simple data items such as a property description are handled. In an unstructured handling condition several such fields may be continued to the same continuation page and arranged in order along with a caption for each value, a potential forwarding message, and other attributes.

As noted above, pages of a document may be constructed by laying compositions or composition elements (such as one of the composition elements 358) on a rendering surface. In general, a composition may be used to describe a unit of information that is authored or composed as a discrete unit. A composition element contains a pre-authored formal description or sequence of text, data, and graphic content meant to be drawn as a unit on a rendering surface.

A composition element may correspond to a page, but may also be a partial page or a re-locatable page segment. There can be more than one composition element 358 for a given rendering surface. The composition elements may be arranged so that they cover an entire rendering surface (for example, one composition element 358 for the top half of the page and another for the bottom half of the page). Alternatively, composition elements may also be arranged so that a composition element assigned a higher level or level number contains content that masks, complements, modifies, or replaces content in a composition element with a lower level or level number. Compositions can manifest themselves as document pages, page-level overlays or instance-level, conditional overlays.

Figure 22:
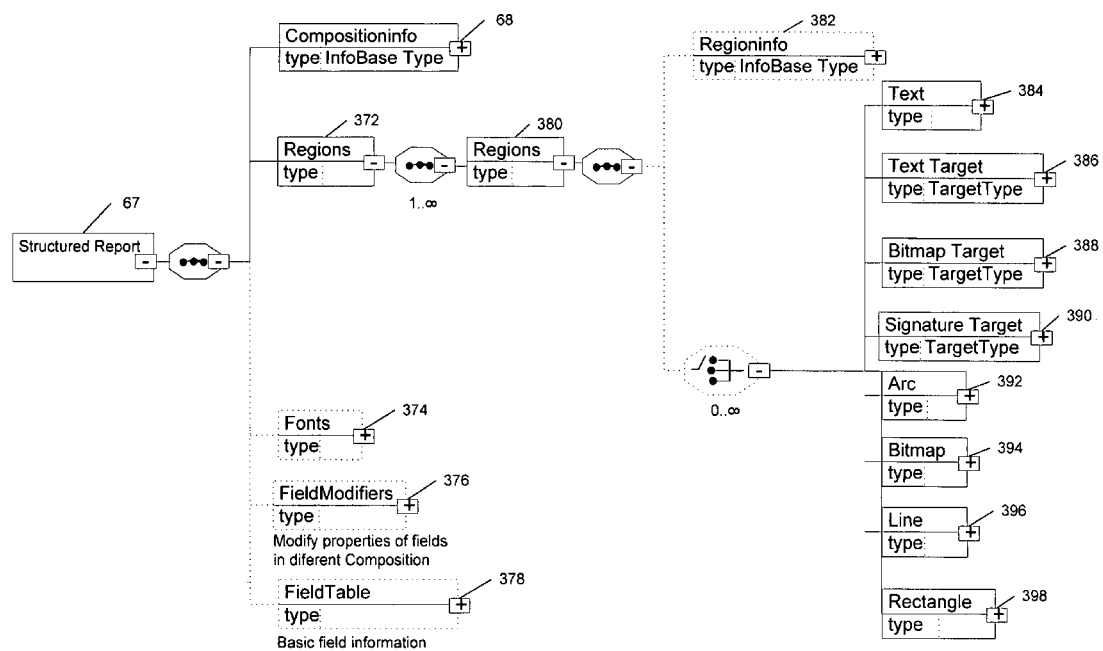
FIG. 22 illustrates the architecture of a composition element.

FIG. 22 illustrates an exemplary architecture of the composition element 358. The composition element 358 may include a composition information element 370, a regions element 372, a font element 374, a field modifiers element 376, and a field table 378. The regions element 372 may include a region element 380. In turn, the region element may include a region information element 382 and one or more target design elements. These target design elements may include a text element 384, a text target element 386, a bitmap target element 388, a signature target element 390, an arc element 392, a bitmap element 394, a line element 396, and a rectangle element 398.

As noted, embodiments of the invention may include a database or knowledge base (e.g., knowledge base 54). Embodiments of the invention may also include a run time instance of the knowledge base 54 (shown as a runtime database 120 in FIGS. 8 and 4). The runtime database 120 is where document content can be associated with various levels of precedence and from which the content for a particular document and precedence can be extracted. The runtime database 120 is generated by the press process 92 from a content store (such as the content 58), which is created by a separate authoring facility (such as the authoring tool 74).

As also noted, in some embodiments, the rules 56/84 are applied to determine the final document content. The rules 56/84 may be used to select content from various alternatives, but can also be used to generate new content according to information supplied in the transaction data or information 61. The rules 56/84 are also used to manipulate and format data. As noted above, the transaction data or information 61 may be supplied according to an agreed upon schema, such as an XML schema or document type definition ("DTD"). Numerous schemas can be used and supported, so long as the schema is agreed upon by the service and service user before the transaction occurs. Each supported transaction schema has an associated resolution catalogue, which may also be an XML document. The resolution catalogue defines the mapping of transaction data to text identifiers used in document components. The resolution methodology used in some embodiments leverages technologies based on XPath (directions for how to get from one place in an XML document to another or how to retrieve elements from an XML document) and XSLT (extensible style sheet language transformations) standards to access transaction data.

In embodiments of the invention it is possible that various data structure may have the same name. For example, the knowledge base may be populated with content from unaffiliated sources and it is possible that the sources used the same names for different structures or components of structures. Thus, it is useful to ensure that names for various data structures properly map.

In embodiments of the invention it is possible to handle name conflicts and discrepancies by performing a dynamic resolution. In some embodiments of the invention, dynamic resolution employs what is called a resolution catalogue. A resolution catalogue may be a collection of XPath statements. The resolution catalog provides a one-to-one correlation of a path (e.g., an XPath) into a data set versus the name of interest. As noted, documents are generated based on transaction information, which may take the form of a transaction XML packet. As also noted, the XML packet may include a list of documents and a transaction data set. The XML processor uses resolution catalogs to evaluate the names to data in the transaction data set. The resolution catalogs inherently prevent name conflicts, as the transaction data is linked to an appropriate catalog based on, for example, the source of the content being used.

As should be apparent to one of ordinary skill in the art, the systems shown in the figures are models of what actual systems might be like. Many of the components and logical structures described are capable of being implemented in software which may be stored as instructions on a computer readable medium (such as an optical disc, disc drive, RAM, ROM, etc.) and executed by a microprocessor or a similar device. Many of the same components are also capable of being implemented in hardware using a variety of components including, for example, application specific integrated circuits ("ASICs"). In addition, capitalized terms, such as "RootDatum" are used. Use of such terms is made to be consistent with common industry and programming practices or to make reference to diagrams easier for the reader. Nothing, however, should be construed as limiting the breadth of such terms merely because they have been capitalized. It should also be understood that while the above description focused on the assembling of documents, the content assembled could take a variety of forms. For example, MPEG files could be assembled using techniques described herein. Similarly, other computer-processable components could be configured according to markup and other mechanisms discussed herein and be assembled to create, for example an album of music files, video files, or photographs.

As can be seen from the above, the present invention provides a system and method of creating documents and assembling computer-processable components. Additional features and advantages of the invention are set forth in the appended claims.

What is claimed is:

1. A data structure generation system comprising:
   a plurality of data structure components, each data structure component configured to have a precedence defining an override level of the data structure component, to include one or more embedded rules, and to include content; and
   a computer-implemented knowledge base configured to be coupled to a data structure assembly facility, the knowledge base configured to store the plurality of data structure components as objects in an object-relational hierarchy, the knowledge base storing a first set of objects and a second set of objects, the first set of objects having a first, read-only precedence level and the second set of objects having a second precedence level higher than the first precedence level.

2. A system as claimed in claim 1, wherein the precedence provides hierarchical control of content to match business preferences.

3. A system as claimed in claim 1, further comprising a data structure assembly facility.

4. A system as claimed in claim 3, wherein the assembly facility is configured to retrieve one or more data structure components from the knowledge base; process the one or more data structure components in a processor to generate a tree having a root node; process the tree beginning at the root node; and to override objects of low precedence with objects of high precedence.

5. A system as claimed in claim 4, wherein the assembly facility is configured to, when an object having a rule is encountered, evaluate the rule and replace the rule with a value.

6. A system as claimed in claim 3, further comprising an authoring tool and a content management system.

7. A system as claimed in claim 6, wherein the content management system is configured to permit a user to create a version of an object in the first set of objects, and save the version of the object at a precedence different than the first precedence level.

8. A system as claimed in claim 6, wherein the content management system is configured to permit a user to create a version of an object in the first set of objects where the version of the object and the object at a different precedence level have the same name.

9. A system as claimed in claim 1, wherein each object is configurable to be locked in order to prevent overriding by an object having a higher precedence level.

10. A computer-implemented knowledge base configured to store data structure components as objects in an object-relational hierarchy, each object configured to have a precedence defining an override level of the object, to include one or more embedded rules, and to include content, the knowledge base storing a first set of data components stored as objects and a second set of data components stored as objects, the first set of data components stored as objects having a first, read-only precedence level and the second set of data components stored as objects having a second precedence level higher than the first precedence level.

11. A knowledge base as claimed in claim 10, wherein each data component stored as an object is configurable to be locked in order to prevent overriding by an object having a higher precedence level.

12. A computer-implemented method of assembling a data structure from a group of components, the method comprising:
   retrieving one or more cross-referenced data structure components from a database, the one or more data structure components configured to have a precedence level defining an override level for the one or more data structure components;
   processing the one or more cross-referenced data structure components in a processor to generate a tree having a root node;
   processing the tree beginning at the root node;
   overriding objects of low precedence with objects of high precedence to create a resulting tree; and
   transforming the resulting tree into a data structure representing a document.

13. A method as claimed in claim 12, further comprising creating a transaction data set.

14. A method as claimed in claim 13, wherein retrieving one or more cross-referenced data structure components from a database includes retrieving the same based on the transaction data set.

15. A method as claimed in claim 13, wherein the one or more data structure components are configured to include one or more rules.

16. A method as claimed in claim 13, further comprising, when a rule is encountered, evaluating the rule and replacing the rule with a value.

17. A method as claimed in claim 12, further comprising configuring each data structure component to be lockable in order to prevent overriding by an object having a higher precedence level.

18. A method as claimed in claim 12, further comprising configuring the database so that it may include a first set of data structure components, a second set of data structure components, and a third set of data structure components, the first set of data structure components having a first, read-only precedence level, the second set of data structure components having a second precedence level higher than the first precedence level, and the third set of data structure components having a third precedence level higher than the second precedence level.

19. A computer readable medium containing instructions for generating a data structure by retrieving one or more cross-referenced data structure components from a computer-implemented database, each of the one or more data structure components configured to have a precedence level defining an override level for the data structure component;

processing the one or more cross-referenced data structure components in a processor to generate a tree having a root node;

processing the tree beginning at the root node;

overriding objects of low precedence with objects of high precedence to create a resulting tree; and transforming the resulting tree into a data structure representing a document.

20. A computer readable medium as claimed in claim 19, further comprising instructions for structuring the one or more data structures to include one or more embedded rules.

21. A computer readable medium as claimed in claim 20, further comprising instructions for processing the one or more data structures components by evaluating a rule and replacing the rule with a value when the rule is encountered.

* * * * *